(12) United States Patent
Fujishiro

(10) Patent No.: US 9,532,294 B2
(45) Date of Patent: Dec. 27, 2016

(54) MOBILE COMMUNICATION SYSTEM, TRANSMISSION-SIDE TERMINAL, MOBILE COMMUNICATION METHOD AND PROCESSOR

(71) Applicant: KYOCERA CORPORATION, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 64 days.

(21) Appl. No.: 14/408,678

(22) PCT Filed: Jun. 25, 2013

(86) PCT No.: PCT/JP2013/067416
§ 371 (c)(1),
(2) Date: Dec. 17, 2014

(87) PCT Pub. No.: WO2014/003022
PCT Pub. Date: Jan. 3, 2014

(65) Prior Publication Data
US 2015/0373616 A1 Dec. 24, 2015

Related U.S. Application Data

(60) Provisional application No. 61/664,951, filed on Jun. 27, 2012.

(51) Int. Cl.
*H04W 40/12* (2009.01)
*H04L 1/18* (2006.01)
(Continued)

(52) U.S. Cl.
CPC ........... *H04W 40/12* (2013.01); *H04L 1/1854* (2013.01); *H04L 1/1887* (2013.01);
(Continued)

(58) Field of Classification Search
None
See application file for complete search history.

(56) References Cited

U.S. PATENT DOCUMENTS

| 5,862,142 A | 1/1999 | Takiyasu et al. |
| 2008/0108304 A1 | 5/2008 | Suga |

(Continued)

FOREIGN PATENT DOCUMENTS

| JP | H08-009455 A | 1/1996 |
| JP | 2008-118499 A | 5/2008 |

(Continued)

OTHER PUBLICATIONS

International Search Report; PCT/JP2013/067416; Sep. 24, 2013.
(Continued)

*Primary Examiner* — Chi H Pham
*Assistant Examiner* — Soon-Dong D Hyun
(74) *Attorney, Agent, or Firm* — Studebaker & Brackett PC

(57) ABSTRACT

The mobile communication system directly performs user-data communication between a plurality of radio terminals without involvement of a radio base station. The user-data communication directly performed between the plurality of radio terminals is performed by using a part of radio resources assigned to the mobile communication system. The plurality of radio terminals comprise: a transmission-side terminal that transmits the user data; and a reception-side terminal that receives the user data. The reception-side terminal comprises: a reception-side transmission unit that transmits a transmission acknowledgement signal indicating whether the user data transmitted from the transmission-side terminal has been able to receive or not. The reception-side transmission unit transmits the transmission acknowledgement signal to the radio base station.

6 Claims, 20 Drawing Sheets

(51) Int. Cl.
*H04W 72/04* (2009.01)
*H04W 92/18* (2009.01)
*H04L 1/00* (2006.01)

(52) U.S. Cl.
CPC ..... *H04L 2001/0097* (2013.01); *H04W 72/04* (2013.01); *H04W 92/18* (2013.01)

(56) References Cited

U.S. PATENT DOCUMENTS

| | | | |
|---|---|---|---|
| 2010/0146354 A1 | 6/2010 | Zhang et al. | |
| 2011/0159799 A1 | 6/2011 | Chen et al. | |
| 2012/0028672 A1* | 2/2012 | Chen | H04W 52/241 455/522 |
| 2012/0093098 A1 | 4/2012 | Charbit et al. | |
| 2012/0327760 A1* | 12/2012 | Du | H04L 1/1887 370/216 |
| 2013/0195026 A1* | 8/2013 | Johnsson | H04W 72/085 370/329 |
| 2014/0010175 A1* | 1/2014 | Chiu | H04W 72/042 370/329 |
| 2014/0044082 A1 | 2/2014 | Iwamura et al. | |
| 2014/0086158 A1* | 3/2014 | Tavildar | H04L 1/1607 370/329 |
| 2014/0321367 A1* | 10/2014 | Marupaduga | H04W 72/048 370/329 |
| 2015/0173048 A1* | 6/2015 | Seo | H04W 72/1247 370/329 |

FOREIGN PATENT DOCUMENTS

| | | |
|---|---|---|
| JP | 2008-547344 A | 12/2008 |
| JP | 2011-151444 A | 8/2011 |
| JP | 2012-244367 A | 12/2012 |
| WO | 2011/143496 A1 | 11/2011 |

OTHER PUBLICATIONS

Office Action; "Decision of Refusal," issued by the Japanese Patent Office on Dec. 15, 2015, which corresponds to Japanese Patent Application No. 2014-522648 and is related to U.S Appl. No. 14/408,678 with English language Statement of Relevance.

The extended European search report issued by the European Patent Office on Feb. 16, 2016, which corresponds to European Patent Application No. 13809137.6-1851 and is related to U.S. Appl. No. 14/408,678.

Office Action issued by the Japanese Patent Office on Sep. 1, 2015, which corresponds to Japanese Patent Application No. 2014-522648 and is related to U.S. Appl. No. 14/408,678 with a Statement of Relevance of Non-English References.

* cited by examiner

FIG. 6
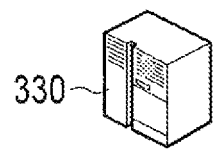
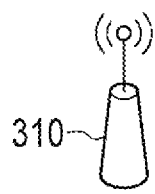
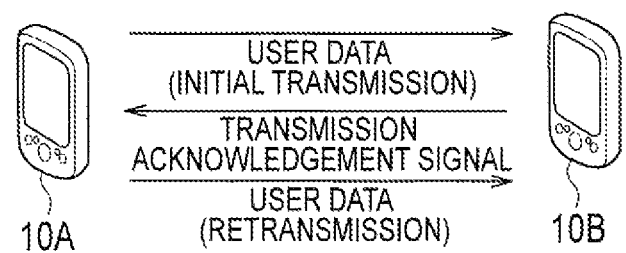

MOBILE COMMUNICATION SYSTEM, TRANSMISSION-SIDE TERMINAL, MOBILE COMMUNICATION METHOD AND PROCESSOR

TECHNICAL FIELD

The present invention relates to a mobile communication system in which user-data communication is directly performed between a plurality of radio terminals, a transmission-side terminal that transmits user data to a reception-side terminal in the mobile communication system, a mobile communication method used in the mobile communication system, and a processor causing the transmission-side terminal to perform a process.

BACKGROUND ART

In recent years, there has been proposed a technology in which communication of user data (data of User-Plane) is directly performed between a plurality of radio terminals without involvement of a radio base station (D2D communication). The user-data communication directly performed between the plurality of radio terminals, is performed by using a part of radio resources assigned to a mobile communication system. However, in the D2D communication, communication of control data (data of C-Plane) is performed via the radio base station, similarly to a conventional mobile communication system.

In general, a transmission acknowledgement signal (Ack/Nack signal), which indicates whether data transmitted from a transmission-side terminal has been able to be received, is transmitted from a reception-side terminal to the transmission-side terminal, so that retransmission control is performed.

Meanwhile, in the D2D communication, the radio base station is able to receive the user data communicated between the plurality of radio terminals. Consequently, in the D2D communication, it is possible to consider various methods as a method for the retransmission control.

SUMMARY OF INVENTION

A mobile communication system according to a first feature directly performs user-data communication between a plurality of radio terminals without involvement of a radio base station. The user-data communication directly performed between the plurality of radio terminals is performed by using a part of radio resources assigned to the mobile communication system. The plurality of radio terminals comprise: a transmission-side terminal that transmits the user data; and a reception-side terminal that receives the user data. The reception-side terminal comprises: a reception-side transmission unit that transmits a transmission acknowledgement signal indicating whether the user data transmitted from the transmission-side terminal has been able to receive or not. The reception-side transmission unit transmits the transmission acknowledgement signal to the radio base station.

A transmission-side terminal according to a second feature transmits user data to a reception-side terminal, of a plurality of radio terminals, in a mobile communication system in which the user-data communication between the plurality of radio terminals is directly performed without involvement of a radio base station. The user-data communication directly performed between the plurality of radio terminals is performed by using a part of radio resources assigned to the mobile communication system. The transmission-side terminal comprises: a transmission-side reception unit that receives a transmission acknowledgement signal indicating whether the reception-side terminal has been able to receive the user data. The transmission-side reception unit directly receives the transmission acknowledgement signal from the reception-side terminal and receives the transmission acknowledgement signal via the radio base station.

A mobile communication method according to a third feature is used in a mobile communication system in which user-data communication between a plurality of radio terminals is directly performed without involvement of a radio base station. The user-data communication directly performed between the plurality of radio terminals is performed by using a part of radio resources assigned to the mobile communication system. The plurality of radio terminals comprise: a transmission-side terminal that transmits the user data; and a reception-side terminal that receives the user data. The mobile communication method comprises: a step A of transmitting, by the reception-side terminal, a transmission acknowledgement signal indicating whether the user data transmitted from the transmission-side terminal has been able to receive or not. The step A comprises: a step of transmitting the transmission acknowledgement signal to the radio base station.

A processor according to a fourth feature causes a transmission-side terminal to perform a process, the transmission-side terminal transmitting user data to a reception-side terminal, of a plurality of radio terminals, in a mobile communication system in which the user-data communication between the plurality of radio terminals is directly performed without involvement of a radio base station. The user-data communication directly performed between the plurality of radio terminals is performed by using a part of radio resources assigned to the mobile communication system. The processor causes the transmission-side terminal to perform a process A of receiving a transmission acknowledgement signal indicating whether the reception-side terminal has been able to receive the user data. The process A comprises: a process of directly receiving the transmission acknowledgement signal from the reception-side terminal and receiving the transmission acknowledgement signal via the radio base station.

BRIEF DESCRIPTION OF DRAWINGS

FIG. 6 is a diagram for explaining the second retransmission control example according to the first embodiment.

DESCRIPTION OF EMBODIMENTS

Figure 1:
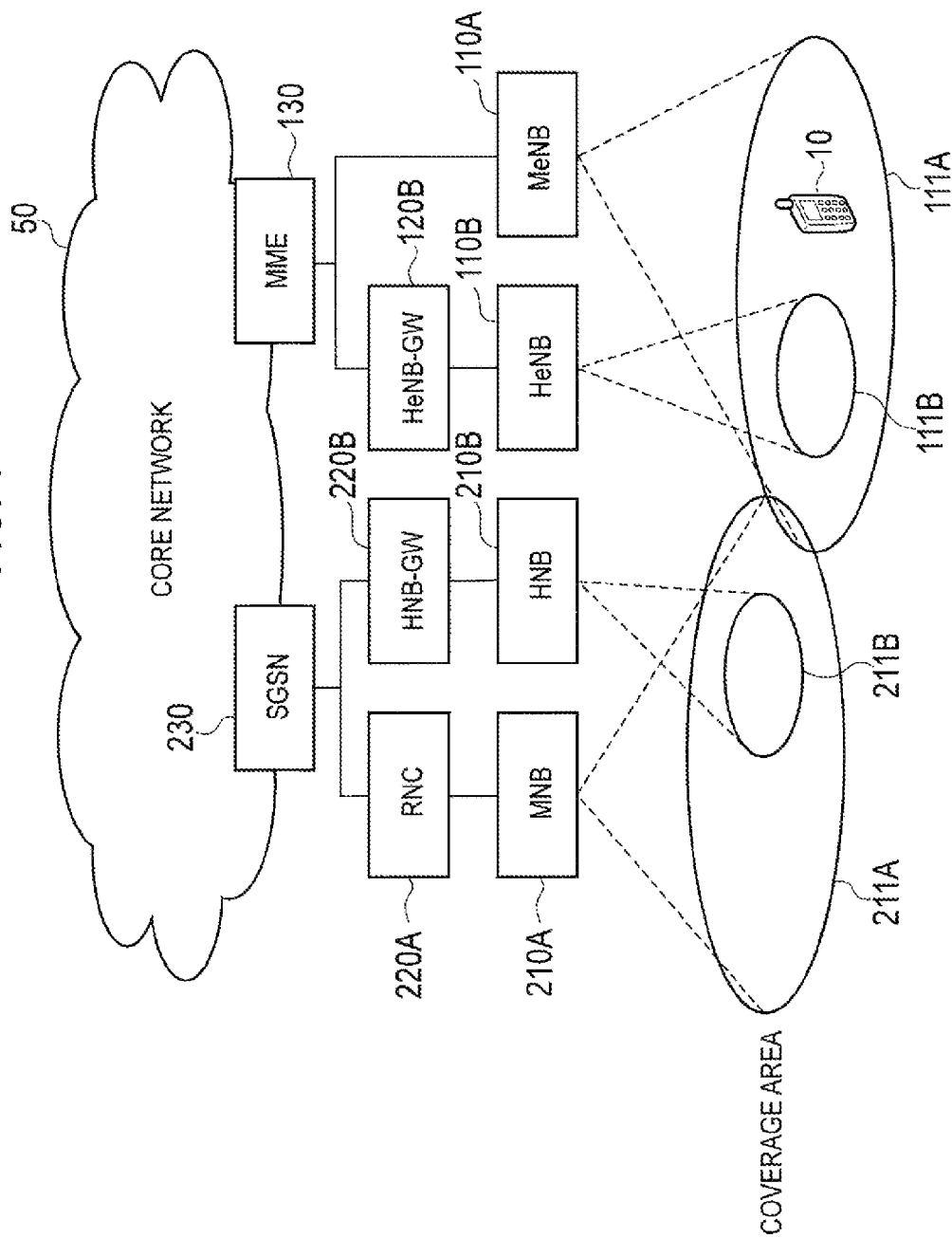
FIG. 1 is a diagram illustrating a mobile communication system 100 according to the first embodiment.

Hereinafter, a mobile communication system according to an embodiment of the present invention will be described with reference to the accompanying drawings. Note that in the descriptions of the drawing below, identical or similar symbols are assigned to identical or similar portions.

It will be appreciated that the drawings are schematically shown and the ratio and the like of each dimension are different from the real ones. Accordingly, specific dimensions should be determined in consideration of the explanation below. Of course, among the drawings, the dimensional relationship and the ratio may be different.

SUMMARY OF THE EMBODIMENT

A mobile communication system according to the embodiment directly performs user-data communication between a plurality of radio terminals without involvement of a radio base station. The user-data communication directly performed between the plurality of radio terminals is performed by using a part of radio resources assigned to the mobile communication system. The plurality of radio terminals comprise: a transmission-side terminal that transmits the user data; and a reception-side terminal that receives the user data. The reception-side terminal comprises: a reception-side transmission unit that transmits a transmission acknowledgement signal indicating whether the user data transmitted from the transmission-side terminal has been able to receive or not. The reception-side transmission unit transmits the transmission acknowledgement signal to the radio base station.

In the embodiment, the reception-side terminal transmits the transmission acknowledgement signal to the radio base station. Consequently, it is possible to appropriately perform the retransmission control of the user data.

For example, when the radio base station receives the user data communicated between a plurality of radio terminals, since the transmission acknowledgement signal is transmitted to the radio base station, the radio base station is able to perform the retransmission control of the user data. Meanwhile, when the transmission-side terminal performs the retransmission control of the user data, it is sufficient if the radio base station transmits the transmission acknowledgement signal to the transmission-side terminal.

Furthermore, the communication directly performed between the plurality of radio terminals without involvement of the radio base station may be called D2D communication. The D2D communication is performed by using a part (a D2D radio resource) of the radio resources assigned to the mobile communication system. As the D2D radio resource, for example, a part of uplink radio resources is used.

Furthermore, a radio resource used in the user-data communication in the D2D communication may be assigned by a radio base station or a radio terminal (a transmission-side terminal or a reception-side terminal).

First Embodiment

Mobile Communication System

Hereinafter, a mobile communication system according to a first embodiment will be described. FIG. 1 is a diagram illustrating a mobile communication system 100 according to the first embodiment.

As illustrated in FIG. 1, the mobile communication system 100 includes a radio terminal 100 (hereinafter, UE 10) and a core network 50. Furthermore, the mobile communication system 100 includes a first communication system and a second communication system.

The first communication system, for example, is a communication system corresponding to LTE (Long Term Evolution). The first communication system, for example, includes a base station 110A (hereinafter, MeNB 110A), a home base station 110B (hereinafter, HeNB 110B), a home base station gateway 120B (hereinafter, HeNB-GW 120B), and MME 130.

A radio access network (E-UTRAN; Evolved Universal Terrestrial Radio Access Network) corresponding to the first communication system is configured from the MeNB 110A, the HeNB 110B, and the HeNB-GW 120B.

The second communication system, for example, is a communication system corresponding to UMTS (Universal Mobile Telecommunication System). The second communication system includes a base station 210A (hereinafter, MNB 210A), a home base station 210B (hereinafter, HNB 210B), RNC 220A, a home base station gateway 220B (hereinafter, HNB-GW 220B), and SGSN 230.

A radio access network (UTRAN; Universal Terrestrial Radio Access Network) corresponding to the second communication system is configured from the MNB 210A, the HNB 210B, the RNC 220A, and the HNB-GW 220B.

The UE 10 is a device (User Equipment) configured to communicate with the second communication system or the first communication system. For example, the UE 10 has a function of performing radio communication with the MeNB 110A and the HeNB 110B. Alternatively, the UE 10 has a function of performing radio communication with the MNB 210A and the HNB 210B.

The MeNB 110A, which manages a general cell 111A, is a device (evolved NodeB) configured to perform radio communication with the UE 10 being present in the general cell 111A.

The HeNB 110B, which manages a specific cell 111B, is a device (Home evolved NodeB) configured to perform radio communication with the UE 10 being present in the specific cell 111B.

The HeNB-GW 120B, which is connected to the HeNB 110B, is a device (Home evolved NodeB Gateway) configured to manage the HeNB 110B.

The MME 130, which is connected to the MeNB 110A, is a device (Mobility Management Entity) configured to manage the mobility of the UE 10 having set up a radio connection with the MeNB 110A. Furthermore, the MME 130, which is connected to the HeNB 110B via the HeNB-GW 120B, is a device configured to manage the mobility of the UE 10 having set up a radio connection with the HeNB 110B.

The MNB 210A, which manages a general cell 211A, is a device (NodeB) configured to perform radio communication with the UE 10 being present in the general cell 211A.

The HNB 210B, which manages a specific cell 211B, is a device (Home NodeB) configured to perform radio communication with the UE 10 being present in the specific cell 211B.

The RNC 220A, which is connected to the MNB 210A, is a device (Radio Network Controller) configured to set up a radio connection (RRC Connection) with the UE 10 being present in the general cell 211A.

The HNB-GW 220B, which is connected to the HNB 210B, is a device (Home NodeB Gateway) configured to set up a radio connection (RRC Connection) with the UE 10 being present in the specific cell 211B.

The SGSN 230 is a device (Serving GPRS Support Node) configured to perform packet switching in a packet switching domain. The SGSN 230 is provided in the core network 50. Although not illustrated in FIG. 1, a device (MSC; Mobile Switching Center) configured to perform circuit switching in a circuit switching domain may be provided in the core network 50.

Furthermore, the general cell and the specific cell must be understood as functions of performing radio communication with the UE 10. However, the general cell and the specific cell are also used as terms indicating coverage areas of cells. Also, cells such as the general cell and the specific cell are identified based on the frequency used in the cell, the spreading code, the time slot, or the like.

Here, a coverage area of the general cell is larger than a coverage area of the specific cell. The general cell, for example, includes a macro cell provided by a communication provider. The specific cell, for example, includes a femto cell or a home cell provided by the third party other than the communication provider. The specific cell may include a CSG (Closed Subscriber Group) cell or a pico cell provided by the communication provider.

Hereinafter, the first communication system will be mainly described. The following description may also be applied to the second communication system.

In the first communication system, OFDMA (Orthogonal Frequency Division Multiple Access) scheme is used as a downlink multiple scheme, and SC-FDMA (Single-Carrier Frequency Division Multiple Access) scheme is used as an uplink multiple scheme.

Furthermore, in the first communication system, an uplink channel includes an uplink control channel (PUCCH; Physical Uplink Control Channel), an uplink shared channel (PUSCH; Physical Uplink Shared Channel), and the like. Furthermore, a downlink channel includes a downlink control channel (PDCCH; Physical Downlink Control Channel), a downlink shared channel (PDSCH; Physical Downlink Shared Channel), and the like.

The uplink control channel is a channel used to transfer a control signal. The control signal, for example, includes CQI (Channel Quality Indicator), PMI (Precoding Matrix Indicator), RI (Rank Indicator), SR (Scheduling Request), and ACK/NACK.

The CQI is a signal for notifying a recommended modulation method and an encoding rate to be used in downlink transmission. The PMI is a signal indicating a precoder matrix which is preferably used in downlink transmission. The RI is a signal indicating the number of layers (the number of streams) to be used in downlink transmission. The SR is a signal for requesting the assignment of an uplink radio resource (a resource block which will be described later). The ACK/NACK is a signal indicating whether a signal transmitted via the downlink channel (for example, the PDSCH) has been successfully received.

The uplink shared channel is a channel used to transfer a control signal (including the above-mentioned control signal) and/or a data signal. For example, the uplink radio resource may be assigned only to the data signal, or assigned such that the data signal and the control signal are multiplexed.

The downlink control channel is a channel used to transfer a control signal. The control signal, for example, includes Uplink SI (Scheduling Information), Downlink SI (Scheduling Information), and a TPC bit.

The Uplink SI is a signal indicating the assignment of the uplink radio resource. The Downlink SI is a signal indicating the assignment of a downlink radio resource. The TPC bit is a signal for instructing increase or decrease in the power of a signal transmitted via the uplink channel.

The downlink shared channel is a channel used to transfer a control signal and/or a data signal. For example, the downlink radio resource may be assigned only to the data signal, or assigned such that the data signal and the control signal are multiplexed.

In addition, a control signal transmitted via the downlink shared channel includes TA (Timing Advance). The TA is transmission timing correction information between the UE 10 and the MeNB 110A, and is measured by the MeNB 110A based on an uplink signal transmitted from the UE 10.

Furthermore, a control signal transmitted via a channel, other than the downlink control channel (the PDCCH) and the downlink shared channel (the PDSCH), includes ACK/NACK. The ACK/NACK is a signal indicating whether a signal transmitted via the uplink channel (for example, the PUSCH) has been successfully received.

The general cell and the specific cell broadcast broadcast information via a broadcast channel (BCCH; Broadcast Control Channel). The broadcast information, for example, is information such as MIB (Master Information Block) or SIB (System Information Block).

Specifically not illustrated in FIG. 1, the first communication system may include a relay node configured to relay data communication between the MeNB 110A (or the HeNB 110B) and the UE 10. Similarly, the second communication system may include a relay node configured to relay data communication with the MNB 210A (or the HNB 210B).

(Radio Frame)

Figure 2:
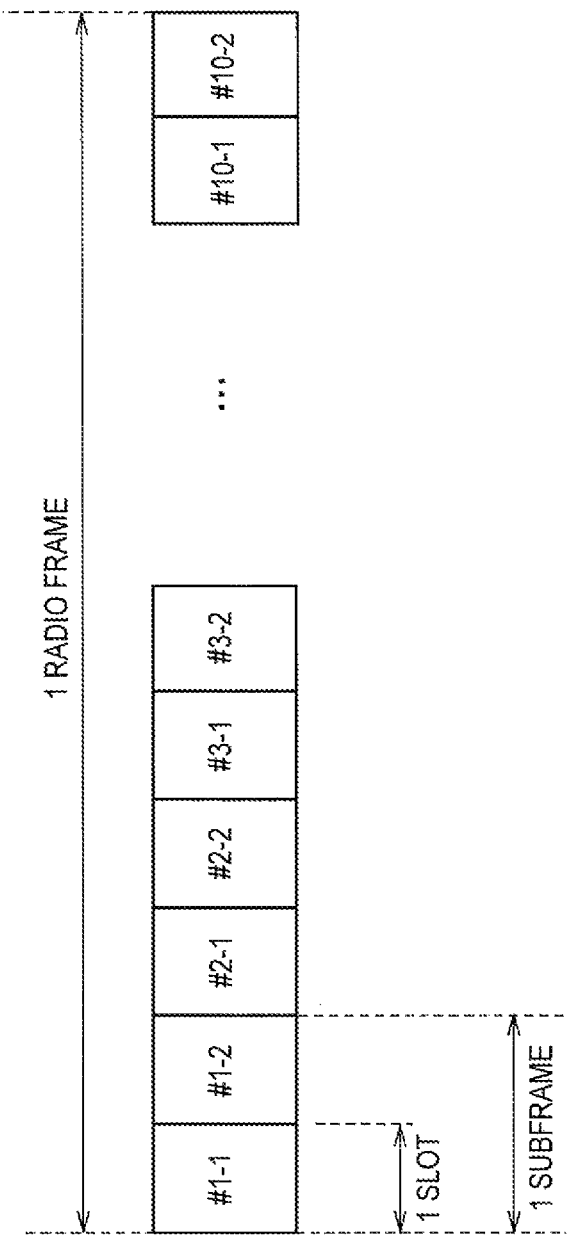
FIG. 2 is a diagram illustrating the radio frame according to the first embodiment.

Hereinafter, a radio frame in the first communication system will be described. FIG. 2 is a diagram illustrating the radio frame in the first communication system.

As illustrated in FIG. 2, one radio frame is configured by 10 subframes and one subframe is configured by two slots. One slot has a time length of 0.5 msec, one subframe has a time length of 1 msec, and one radio frame has a time length of 10 msec.

In addition, one slot is configured by a plurality of OFDM symbols (for example, six OFDM symbols or seven OFDM symbols) in the downward direction. In the same manner, one slot is configured by a plurality of SC-FDMA symbols (for example, six SC-FDMA symbols or seven SC-FDMA symbols) in the upward direction.

(Radio Resource)

Figure 3:
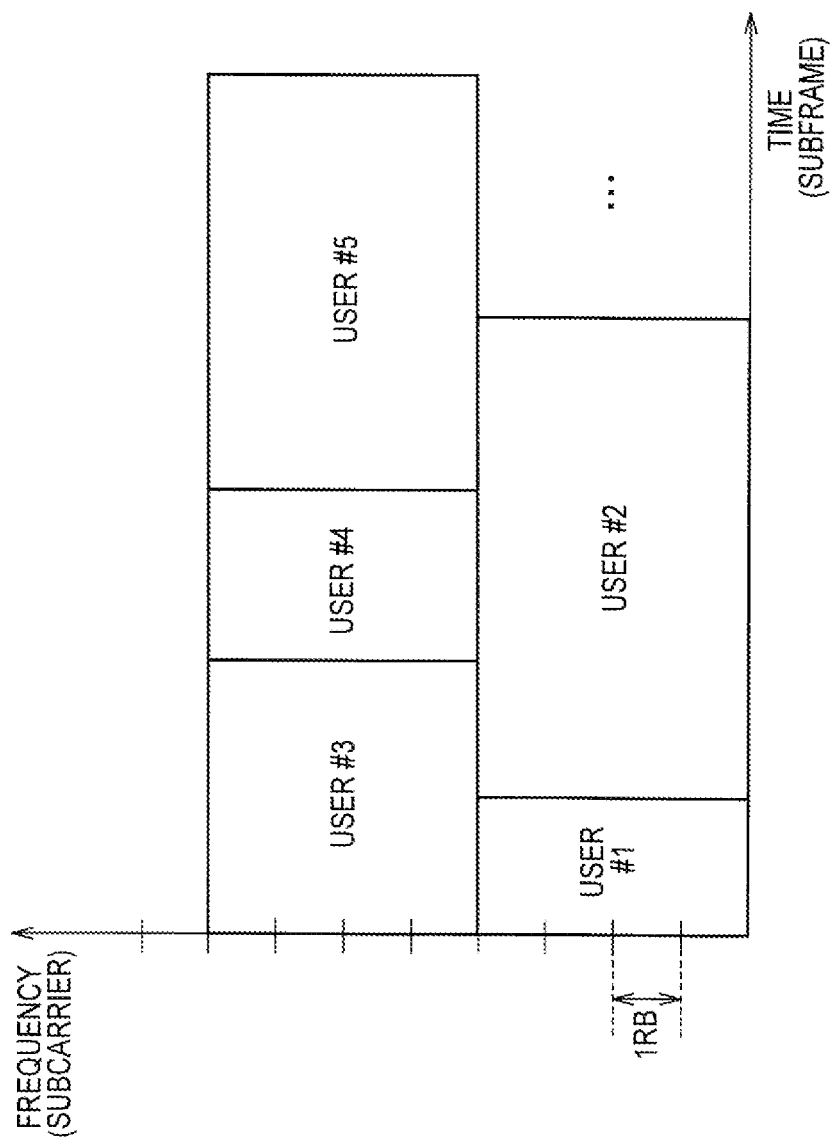
FIG. 3 is a diagram illustrating the radio resource according to the first embodiment.

Hereinafter, a radio resource in the first communication system will be described. FIG. 3 is a diagram illustrating the radio resource in the first communication system.

As illustrated in FIG. 3, a radio resource is defined by a frequency axis and a time axis. A frequency is configured by a plurality of subcarriers, and a predetermined number of subcarriers (12 subcarriers) are collectively called a resource block (RB). A time has a unit, such as the OFDM symbol (or the SC-FDMA symbol), the slot, the subframe, or the radio frame, as described above.

Here, the radio resource is assignable to each one resource block. Furthermore, on the frequency axis and the time axis, it is possible to divide the radio resources to assign the same to a plurality of users (for example, user #1 to user #5).

Furthermore, the radio resource is assigned by the MeNB 110A. The MeNB 110A assigns the radio resource to each UE 10 based on the CQI, the PMI, the RI, and the like.

(Application Case)

Figure 4:
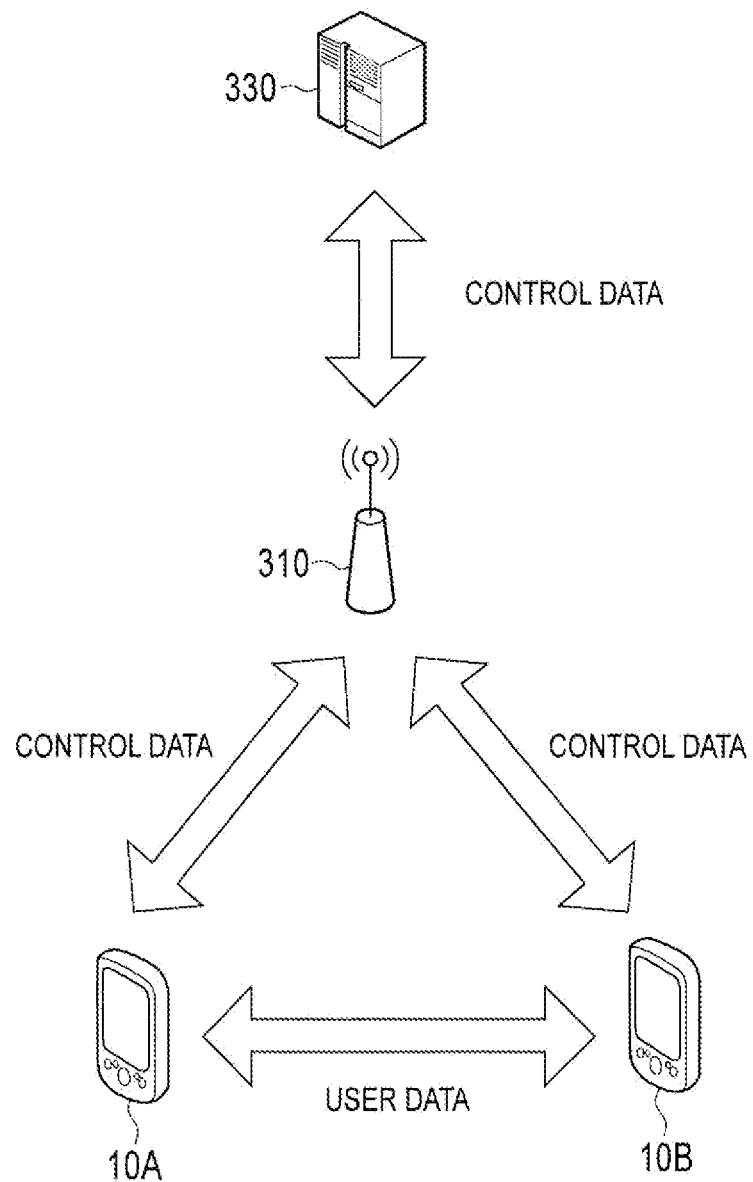
FIG. 4 is a diagram illustrating the application case according to the first embodiment.

Hereinafter, the application case according to the first embodiment will be described. FIG. 4 is a diagram for explaining the application case according to the first embodiment. In FIG. 4, as the UE 10, UE 10A and UE 10B are illustrated. It is preferable that a radio base station 310 is the MeNB 110A or the HeNB 110B. However, the radio base station 310 may be the MNB 210A or the HNB 210B. Alternatively, the radio base station 310 may be a relay node. A network device 330 is a device provided in the core network 50. The network device 330 may be the MME 130 or the SGSN 230.

As illustrated in FIG. 4, the communication of user data (data of User-Plane) is directly performed between a plurality of radio terminals without involvement of a radio base station (hereinafter, D2D communication). Meanwhile, communication of control data (data of C-Plane) is performed via the radio base station, similarly to that in a conventional mobile communication system.

Furthermore, the D2D communication is performed by using a part (hereinafter, a D2D radio resource) of radio resources assigned to the mobile communication system. As the D2D radio resource, for example, a part of uplink radio resources is used. A radio resource used in the user-data communication in the D2D communication may be assigned by a radio base station or a radio terminal (a transmission-side terminal or a reception-side terminal).

For example, it is preferable that the D2D radio resource is broadcasted from each cell managed by the radio base station. The D2D radio resource, for example, is included in MIB (Master Information Block) or SIB (System Information Block).

First Retransmission Control Example

Figure 5:
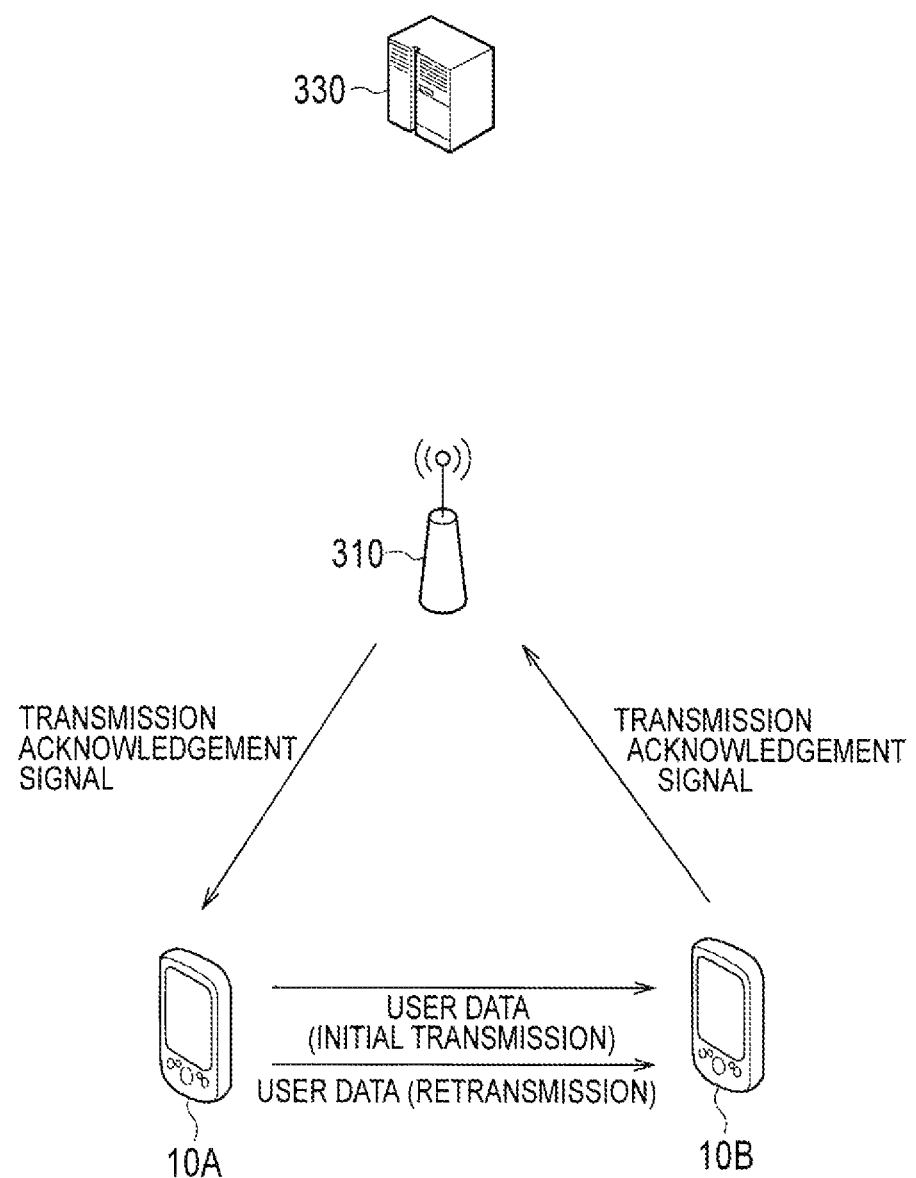
FIG. 5 is a diagram for explaining the first retransmission control example according to the first embodiment.

Hereinafter, a first retransmission control example according to the first embodiment will be described. FIG. 5 is a diagram for explaining the first retransmission control example according to the first embodiment. In FIG. 5, as the UE 10, the UE 10A and the UE 10B are illustrated. The UE 10A is an example of a transmission-side terminal and the UE 10B is an example of a reception-side terminal.

As illustrated in FIG. 5, the UE 10B transmits, to the radio base station 310, a transmission acknowledgement signal (ACK/NACK) indicating whether user data transmitted from the UE 10A has been able to be received. In response to the transmission acknowledgement signal received from the UE 10B, the radio base station 310 transmits the transmission acknowledgement signal to the UE 10A. For example, the radio base station 310 may relay the transmission acknowledgement signal, which is received from the UE 10B, to the UE 10A. Alternatively, the radio base station 310 may transmit the transmission acknowledgement signal to the UE 10A, together with a signal for assigning a radio resource used in the user-data communication in the D2D communication to the UE 10A.

When the transmission acknowledgement signal is NACK indicating that it is not possible to receive the user data, the UE 10A retransmits the user data to the UE 10B.

It should be noted that, as described above, the first retransmission control example is the case in which the UE 10A (the transmission-side terminal) performs retransmission control.

Second Retransmission Control Example

Hereinafter, a second retransmission control example according to the first embodiment will be described. FIG. 6 is a diagram for explaining the second retransmission control example according to the first embodiment. In FIG. 6, as the UE 10, the UE 10A and the UE 10B are illustrated. The UE 10A is an example of a transmission-side terminal and the UE 10B is an example of a reception-side terminal.

As illustrated in FIG. 6, the UE 10B transmits, to the UE 10A, a transmission acknowledgement signal (ACK/NACK) indicating whether user data transmitted from the UE 10A has been able to be received. When the transmission acknowledgement signal is NACK indicating that it is not possible to receive the user data, the UE 10A retransmits the user data to the UE 10B.

It should be noted that, as described above, the second retransmission control example is the case in which the UE 10A (the transmission-side terminal) performs retransmission control.

Third Retransmission Control Example

Figure 7:
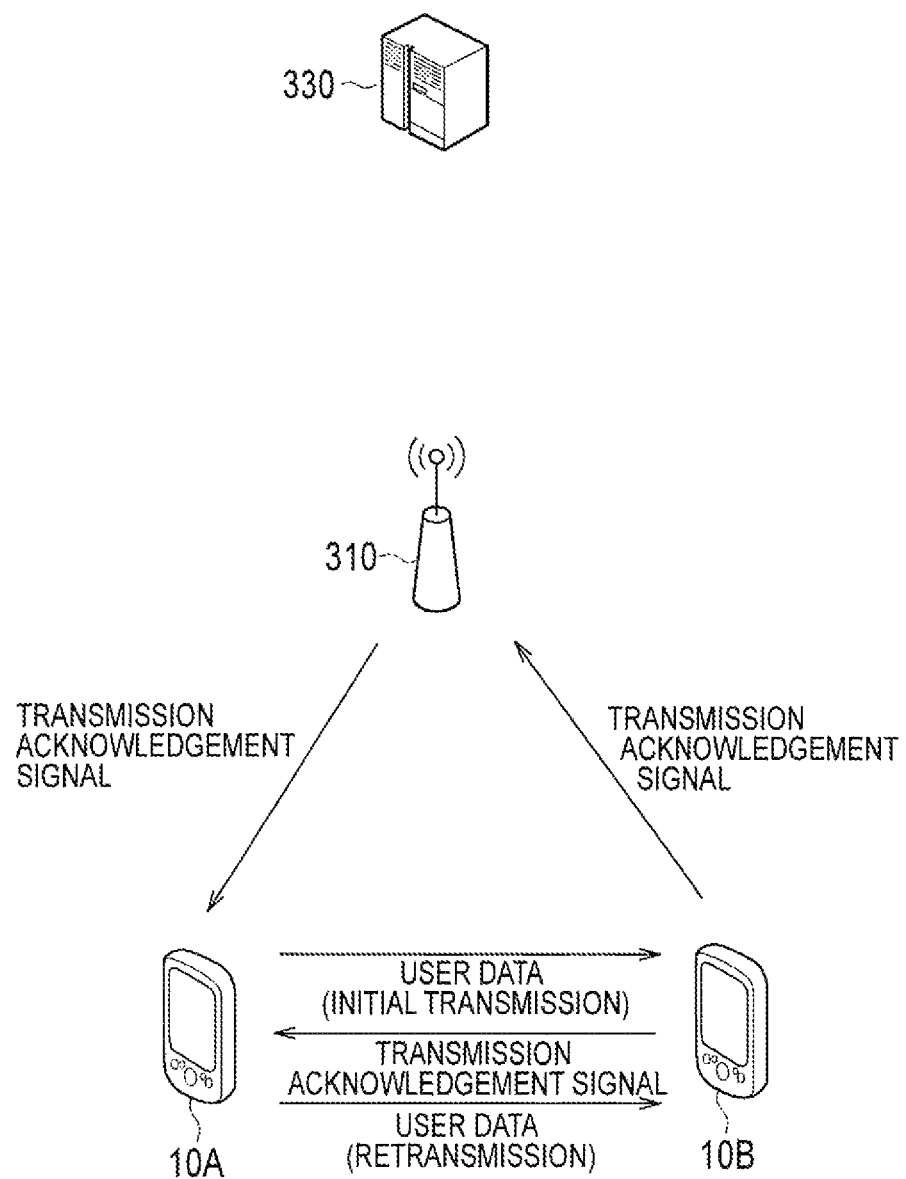
FIG. 7 is a diagram for explaining the third retransmission control example according to the first embodiment.

Hereinafter, a third retransmission control example according to the first embodiment will be described. FIG. 7 is a diagram for explaining the third retransmission control example according to the first embodiment. In FIG. 7, as the UE 10, the UE 10A and the UE 10B are illustrated. The UE 10A is an example of a transmission-side terminal and the UE 10B is an example of a reception-side terminal.

As illustrated in FIG. 7, the UE 10B transmits, to the UE 10A and the radio base station 310, a transmission acknowledgement signal (ACK/NACK) indicating whether user data transmitted from the UE 10A has been able to be received. In response to the transmission acknowledgement signal received from the UE 10B, the radio base station 310 transmits the transmission acknowledgement signal to the UE 10A. For example, the radio base station 310 may relay the transmission acknowledgement signal, which is received from the UE 10B, to the UE 10A. Alternatively, the radio base station 310 may transmit the transmission acknowledgement signal to the UE 10A, together with a signal for assigning a radio resource used in the user-data communication in the D2D communication to the UE 10A. The UE 10A performs retransmission control of the user data on the basis of the transmission acknowledgement signal received from the UE 10B and the transmission acknowledgement signal received via the radio base station 310.

For example, when one of the transmission acknowledgement signals received from the UE 10B and the radio base station 310 is NACK, the UE 10A retransmits the user data to the UE 10B. Alternatively, when a communication state of the user data directly performed between the UE 10A and the UE 10B is good, the UE 10A may refer to the transmission acknowledgement signal received from the UE 10B without referring to the transmission acknowledgement signal received via the radio base station 310. In such a case, it is preferable that the UE 10A notifies the radio base station 310 of whether to refer to the transmission acknowledgement signal received via the radio base station 310. When the radio base station 310 is notified of the fact that the transmission acknowledgement signal is not referred to, it is preferable that the radio base station 310 omits the transmission of the transmission acknowledgement signal to the UE 10A.

Alternatively, when the communication state of the user data directly performed between the UE 10A and the UE 10B is good, the UE 10B may omit the transmission of the transmission acknowledgement signal to the radio base station 310. In other words, when the communication state of the user data directly performed between the UE 10A and the UE 10B is poor, the UE 10B transmits the transmission acknowledgement signal to the radio base station 310.

Furthermore, the case in which the communication state is good includes the case in which transmission power used for the user-data communication is below a threshold value, or the case in which a modulation coding scheme used for the user-data communication exceeds a threshold value. Alternatively, the case in which the communication state is good may include the case in which a block error rate is below a threshold value, the case in which a packet error rate is below a threshold value, the case in which QoS is satisfied, the case in which CQI exceeds a threshold value, and the case in which a processing load of the UE 10A is below a threshold value.

Furthermore, the case in which the communication state is poor includes the case in which the transmission power used for the user-data communication exceeds a threshold value, or the case in which the modulation coding scheme used for the user-data communication is below a threshold value. Alternatively, the case in which the communication state is poor may include the case in which the block error rate exceeds a threshold value, the case in which the packet error rate exceeds a threshold value, the case in which the QoS is not satisfied, the case in which the CQI is below a threshold value, and the case in which the processing load of the UE 10A exceeds a threshold value.

It should be noted that, as described above, the third retransmission control example is the case in which the UE 10A (the transmission-side terminal) performs retransmission control.

Fourth Retransmission Control Example

Figure 8:
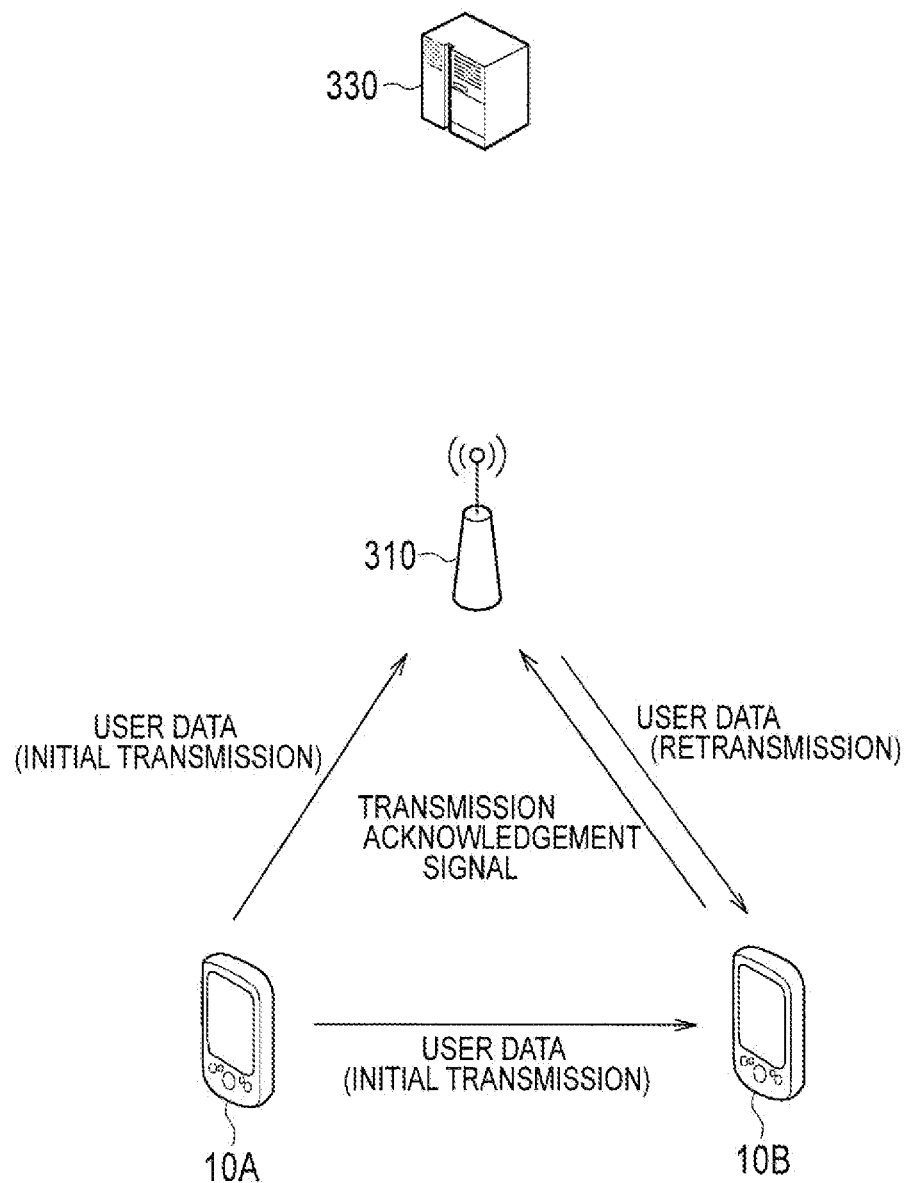
FIG. 8 is a diagram for explaining the fourth retransmission control example according to the first embodiment.

Hereinafter, a fourth retransmission control example according to the first embodiment will be described. FIG. 8 is a diagram for explaining the fourth retransmission control example according to the first embodiment. In FIG. 8, as the UE 10, the UE 10A and the UE 10B are illustrated. The UE 10A is an example of a transmission-side terminal and the UE 10B is an example of a reception-side terminal.

As illustrated in FIG. 8, the UE 10B transmits, to the radio base station 310, a transmission acknowledgement signal (ACK/NACK) indicating whether user data transmitted from the UE 10A has been able to be received. The radio base station 310 assigns a radio resource, which is assigned to the user-data communication directly performed between the UE 10A and the UE 10B, as a reception resource for receiving the user data. In this way, the radio base station 310 is able to receive the user data transmitted from the UE 10A to the UE 10B. When the transmission acknowledgement signal is NACK indicating that it is not possible to receive the user data, the radio base station 310 retransmits the user data to the UE 10B.

It should be noted that, as described above, the fourth retransmission control example is the case in which the radio base station 310 performs retransmission control.

Fifth Retransmission Control Example

Figure 9:
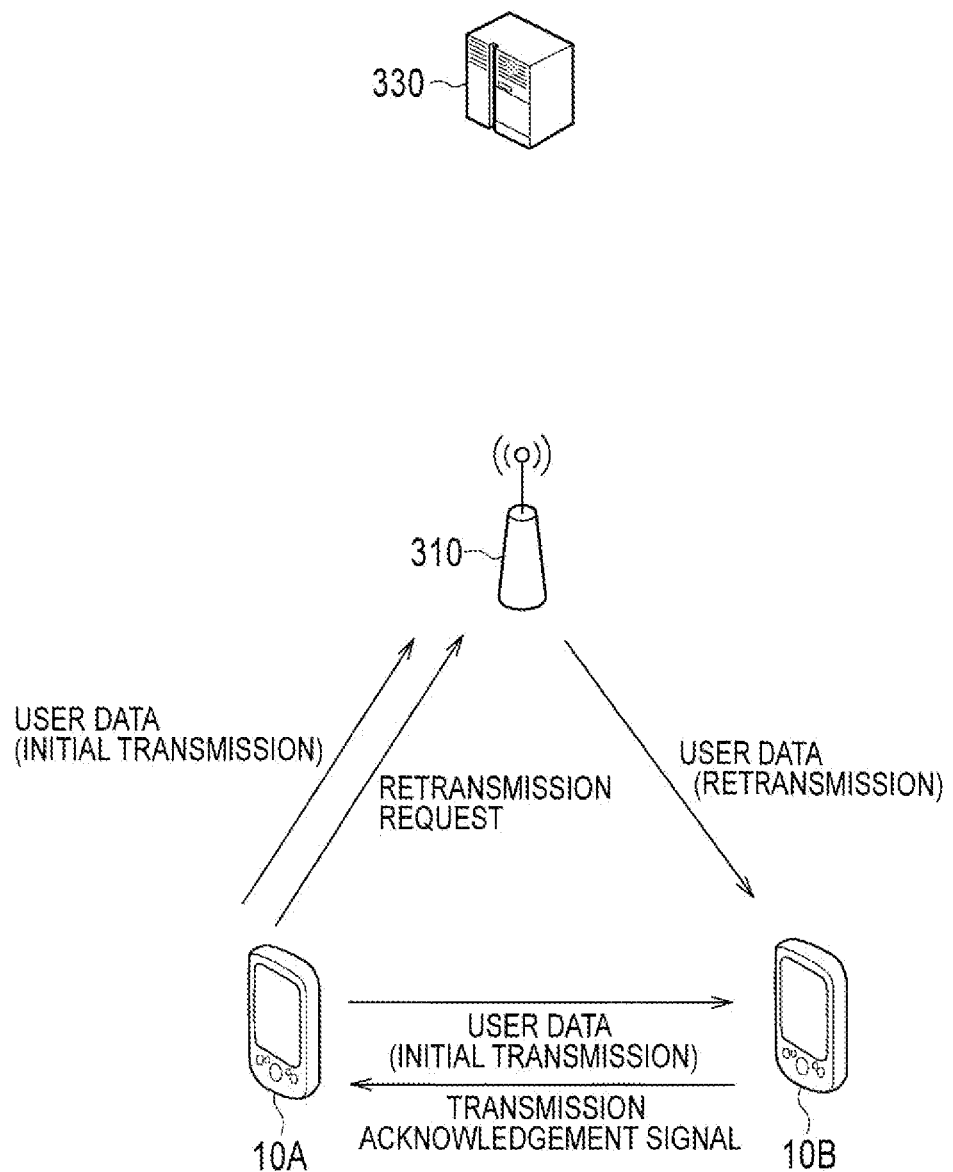
FIG. 9 is a diagram for explaining the fifth retransmission control example according to the first embodiment.

Hereinafter, a fifth retransmission control example according to the first embodiment will be described. FIG. 9 is a diagram for explaining the fifth retransmission control example according to the first embodiment. In FIG. 9, as the UE 10, the UE 10A and the UE 10B are illustrated. The UE 10A is an example of a transmission-side terminal and the UE 10B is an example of a reception-side terminal.

As illustrated in FIG. 9, the UE 10B transmits, to the UE 10A, a transmission acknowledgement signal (ACK/NACK) indicating whether user data transmitted from the UE 10A has been able to be received. When the transmission acknowledgement signal is NACK indicating that it is not possible to receive the user data, the UE 10A transmits a retransmission request of the user data to the radio base station 310. The radio base station 310 assigns a radio resource, which is assigned to the user-data communication directly performed between the UE 10A and the UE 10B, as a reception resource for receiving the user data. In this way, the radio base station 310 is able to receive the user data transmitted from the UE 10A to the UE 10B. When the retransmission request is received, the radio base station 310 retransmits the user data to the UE 10B.

It should be noted that, as described above, the fifth retransmission control example is the case in which the radio base station 310 performs retransmission control.

(Reception Resource)

Figure 10:
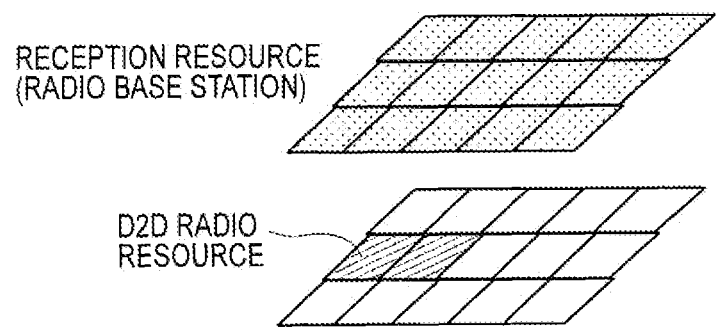
FIG. 10 is a diagram for explaining the reception resource according to the first embodiment.
Figure 11:
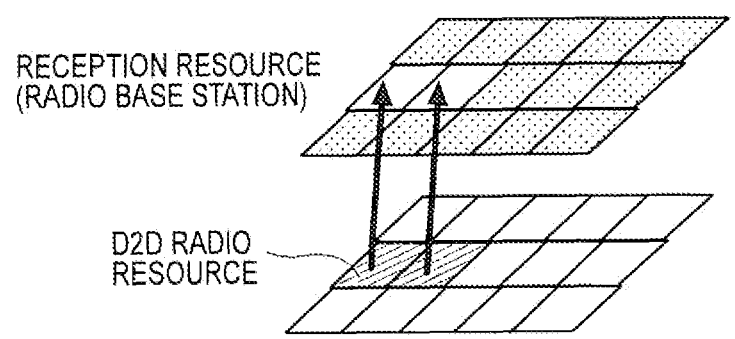
FIG. 11 is a diagram for explaining the reception resource according to the first embodiment.

Hereinafter, the reception resource according to the first embodiment will be described. FIG. 10 and FIG. 11 are diagrams for explaining the reception resource according to the first embodiment.

As illustrated in FIG. 10, when the radio resource assigned to the D2D communication is not assigned as the reception resource for receiving the user data transmitted from the UE 10A to the UE 10B, the radio base station 310 is not able to receive the user data transmitted from the UE 10A to the UE 10B. In such a case, the radio base station 310 is able to receive uplink user data from another UE 10 by using the radio resource assigned to the D2D communication.

As illustrated in FIG. 11, when the radio resource assigned to the D2D communication is assigned as the reception resource for receiving the user data transmitted from the UE 10A to the UE 10B, the radio base station 310 is able to receive the user data transmitted from the UE 10A to the UE 10B. In such a case, the radio base station 310 is not able to receive uplink user data from another UE 10 by using the radio resource assigned to the D2D communication.

(Transmission-Side Terminal)

Figure 12:
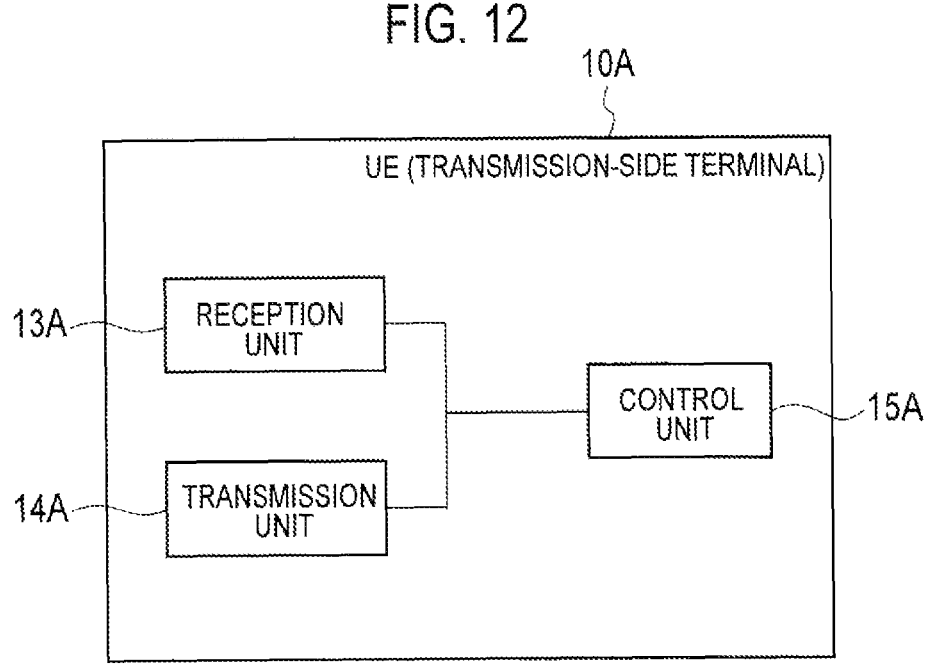
FIG. 12 is a diagram illustrating the UE 10A (transmission-side terminal) according to the first embodiment.

Hereinafter, the transmission-side terminal according to the first embodiment will be described. Furthermore, as the transmission-side terminal, the UE 10A is illustrated. FIG. 12 is a block diagram illustrating the UE 10A according to the first embodiment.

As illustrated in FIG. 12, the UE 10A includes a reception unit 13A, a transmission unit 14A, and a control unit 15A.

The reception unit 13A receives data from the radio base station 310 in cellular communication. The reception unit 13A receives data from the UE 10B in the D2D communication. For example, in the D2D communication, the reception unit 13A may receive, from the UE 10B, a transmission acknowledgement signal (ACK/NACK) indicating whether it is possible to receive user data. As described above, the reception unit 13A may receive the transmission acknowledgement signal via the radio base station 310 in the D2D communication.

The transmission unit 14A transmits data to the radio base station 310 in the cellular communication. The transmission unit 14A transmits data to the UE 10B in the D2D communication. For example, the transmission unit 14A transmits user data to the UE 10B in the D2D communication. Furthermore, the transmission unit 14A retransmits the user data to the UE 10B in response to an instruction output from the control unit 15A.

Furthermore, as described in the aforementioned fifth retransmission control example, when the transmission acknowledgement signal is NACK indicating that it is not possible to receive the user data, the transmission unit 14A may transmit a retransmission request of the user data to the radio base station 310.

The control unit 15A controls the UE 10A. Specifically, on the basis of the transmission acknowledgement signal received from the UE 10B and the transmission acknowledgement signal received via the radio base station 310, the control unit 15A determines whether to retransmit the user data to the UE 10B. That is, the control unit 15A performs retransmission control of the user data. When determining to retransmit the user data, the control unit 15A instructs the transmission unit 14A to retransmit the user data.

For example, when one of the transmission acknowledgement signals received from the UE 10B and the radio base station 310 is NACK, the control unit 15A determines to retransmit the user data to the UE 10B. Alternatively, when the communication state of the user data directly performed between the UE 10A and the UE 10B is good, the control unit 15A may refer to the transmission acknowledgement signal received from the UE 10B without referring to the transmission acknowledgement signal received via the radio base station 310. In such a case, it is preferable that the control unit 15A notifies the radio base station 310 of whether to refer to the transmission acknowledgement signal received via the radio base station 310.

(Reception-Side Terminal)

Figure 13:
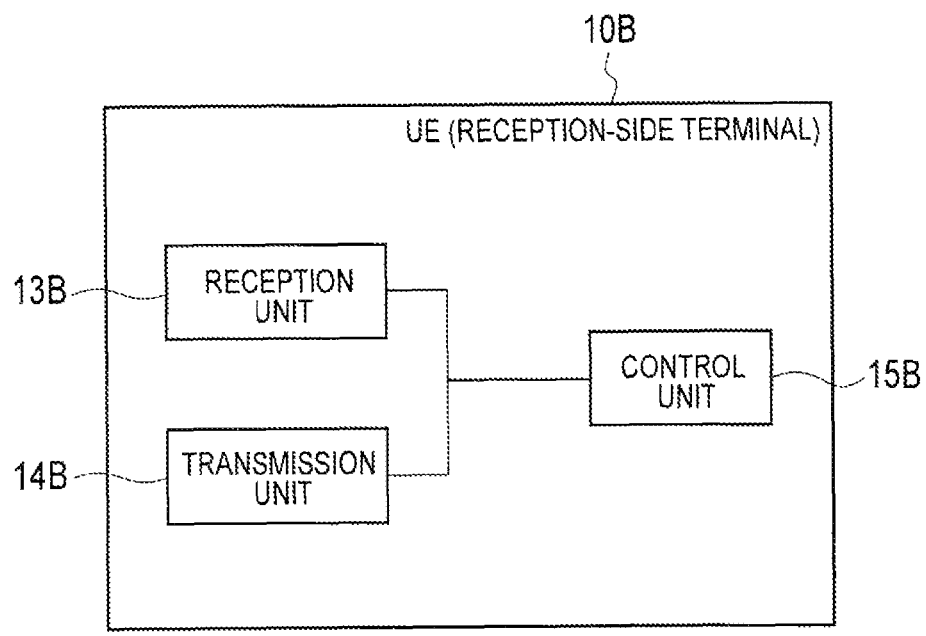
FIG. 13 is a diagram illustrating the UE 10B (reception-side terminal) according to the first embodiment.

Hereinafter, the reception-side terminal according to the first embodiment will be described. Furthermore, as the reception-side terminal, the UE 10B is illustrated. FIG. 13 is a block diagram illustrating the UE 10B according to the first embodiment.

As illustrated in FIG. 13, the UE 10B includes a reception unit 13B, a transmission unit 14B, and a control unit 15B.

The reception unit 13B receives data from the radio base station 310 in the cellular communication. The reception unit 13B receives data from the UE 10A in the D2D communication. For example, in the D2D communication, the reception unit 13B receives user data (initial transmission) transmitted from the UE 10A. Furthermore, the reception unit 14A receives user data (retransmission) retransmitted from the UE 10A.

The transmission unit 14B transmits data to the radio base station 310 in the cellular communication. The transmission unit 14B transmits data to the UE 10A in the D2D communication. For example, the transmission unit 14B may transmit, to the UE 10A, a transmission acknowledgement signal (ACK/NACK) indicating whether it is possible to receive user data. In the first embodiment, the transmission unit 14B may transmit the transmission acknowledgement signal (ACK/NACK) to the radio base station 310 in the D2D communication.

The control unit 15B controls the UE 10B. For example, the control unit 15B determines whether it is possible to receive the user data transmitted from the UE 10A and instructs the transmission unit 14B to transmit the transmission acknowledgement signal. Specifically, when it is possible to receive the user data, the control unit 15B instructs the transmission unit 14B to transmit ACK. Meanwhile, when it is not possible to receive the user data, the control unit 15B instructs the transmission unit 14B to transmit NACK.

When the communication state of the user data directly performed between the UE 10A and the UE 10B is good, the control unit 15B may omit the transmission of the transmission acknowledgement signal to the radio base station 310. In other words, when the communication state of the user data directly performed between the UE 10A and the UE 10B is poor, the control unit 15B instructs the transmission unit 14B to transmit the transmission acknowledgement signal to the radio base station 310. That is, when the communication state of the user data is poor, the transmission unit 14B transmits the transmission acknowledgement signal to the radio base station 310.

(Radio Base Station)

Figure 14:
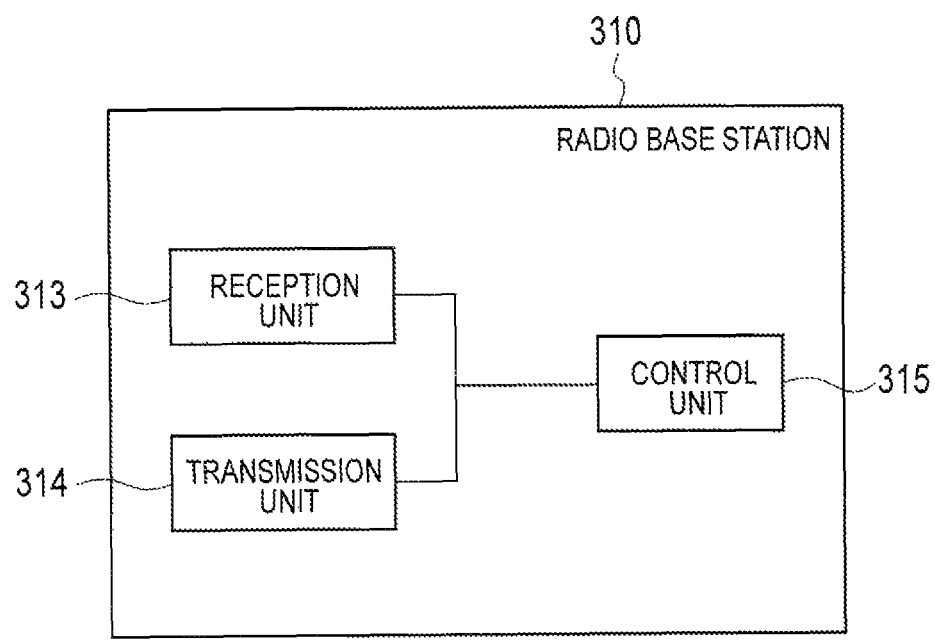
FIG. 14 is a diagram illustrating the radio base station 310 according to the first embodiment.

Hereinafter, the radio base station according to the first embodiment will be described. FIG. 14 is a block diagram illustrating the radio base station 310 according to the first embodiment.

As illustrated in FIG. 14, the radio base station 310 includes a reception unit 313, a transmission unit 314, and a control unit 315.

The reception unit 313 receives data from the UE 10. For example, in the D2D communication, the reception unit 313 receives, from the UE 10B, a transmission acknowledgement signal (ACK/NACK) indicating whether it is possible to receive user data. Furthermore, the reception unit 313 may receive the user data transmitted from the UE 10A to the UE 10B.

The transmission unit 314 transmits data to the UE 10. For example, in the D2D communication, in response to the transmission acknowledgement signal (ACK/NACK) received from the UE 10B, the transmission unit 314 transmits the transmission acknowledgement signal to the UE 10A. For example, the transmission unit 314 may relay the transmission acknowledgement signal, which is received from the UE 10B, to the UE 10A. Alternatively, the transmission unit 314 may transmit the transmission acknowledgement signal to the UE 10A, together with a signal for assigning the radio resource used in the user-data communication to the UE 10A in the D2D communication. Furthermore, in the D2D communication, when NACK indicating that it is not possible to receive the user data is received from the UE 10B, the transmission unit 314 retransmits the user data to the UE 10B. Alternatively, in the D2D communication, when a retransmission request is received from the UE 10A, the transmission unit 314 retransmits the user data to the UE 10B.

The control unit 315 controls the radio base station 310. Specifically, the control unit 315 assigns uplink and downlink radio resources to the UE 10. Furthermore, the control unit 315 may assign the radio resource, which is assigned to the user-data communication directly performed between the UE 10A and the UE 10B, as the reception resource for receiving the user data.

In the first embodiment, on the basis of a reception state of the user data received by using the reception resource in the D2D communication, the control unit 315 may determine whether to transmit the transmission acknowledgement signal. For example, when the reception state of the user data is good, the control unit 315 instructs the transmission unit 314 to omit the transmission of the transmission acknowledgement signal. In other words, when the reception state of the user data is poor, the control unit 315 instructs the transmission unit 314 to transmit the transmission acknowledgement signal.

In the first embodiment, on the basis of the transmission acknowledgement signal received from the UE 10B in the D2D communication, the control unit 315 determines whether to retransmit the user data to the UE 10B. That is, the control unit 315 performs retransmission control of the user data. When determining to retransmit the user data, the control unit 315 instructs the transmission unit 14A to retransmit the user data received by using the reception resource.

(Operation of Mobile Communication System)

Hereinafter, the operation of the mobile communication system according to the first embodiment will be described. FIG. 15 to FIG. 20 are diagrams illustrating the operation of a mobile communication system 100 according to the first embodiment.

Firstly, the first retransmission control example illustrated in FIG. 5 will be described with reference to FIG. 15. In the case illustrated in FIG. 15, a radio resource used in the user-data communication in the D2D communication is assigned by the radio base station 310 and retransmission control of the user data is performed by the UE 10A.

Figure 15:
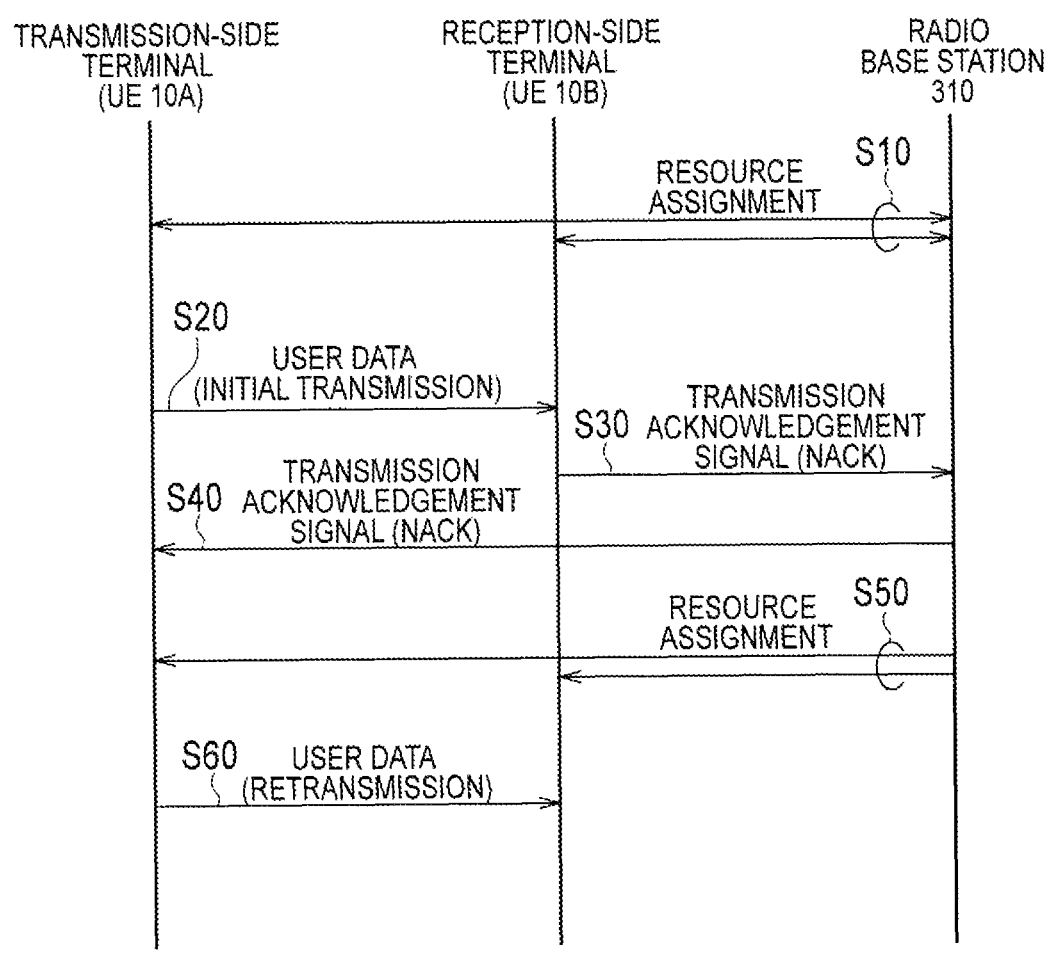
FIG. 15 is a diagram illustrating the operation of the mobile communication system 100 according to the first embodiment.

As illustrated in FIG. 15, in step 10, the radio base station 310 assigns, to the UE 10A and the UE 10B, the radio resource used in the user-data communication in the D2D communication from among D2D radio resources. The radio base station 310 notifies the UE 10A and the UE 10B of the assigned radio resource.

In step 20, the UE 10A transmits user data (initial transmission) to the UE 10B by using the radio resource assigned in step 10. Similarly, the UE 10B receives the user data (initial transmission) from the UE 10A by using the radio resource assigned in step 10.

In step 30, the UE 10B transmits, to the radio base station 310, a transmission acknowledgement signal indicating whether the user data (initial transmission) has been able to be received. Hereinafter, the following description will be given on the assumption that NACK is transmitted as the transmission acknowledgement signal.

In step 40, in response to the transmission acknowledgement signal received from the UE 10B, the radio base station 310 transmits the transmission acknowledgement signal to the UE 10A. Furthermore, the radio base station 310 may relay the transmission acknowledgement signal, which is received from the UE 10B, to the UE 10A. In addition, the radio base station 310 may transmit the transmission acknowledgement signal to the UE 10A, together with a signal for assigning the radio resource used in the user-data communication in the D2D communication to the UE 10A (for example, step 50).

In step 50, the radio base station 310 assigns, to the UE 10A and the UE 10B, the radio resource used in the user-data communication in the D2D communication from among the D2D radio resources. The radio base station 310 notifies the UE 10A and the UE 10B of the assigned radio resource.

In step 60, the UE 10A transmits user data (retransmission) to the UE 10B by using the radio resource assigned in step 50. Similarly, the UE 10B receives the user data (retransmission) from the UE 10A by using the radio resource assigned in step 50.

Secondly, the second retransmission control example illustrated in FIG. 6 will be described with reference to FIG. 16. In the case illustrated in FIG. 16, the radio resource used in the user-data communication in the D2D communication is assigned by the UE 10 (the UE 10A or the UE 10B) and retransmission control of the user data is performed by the UE 10A.

Figure 16:
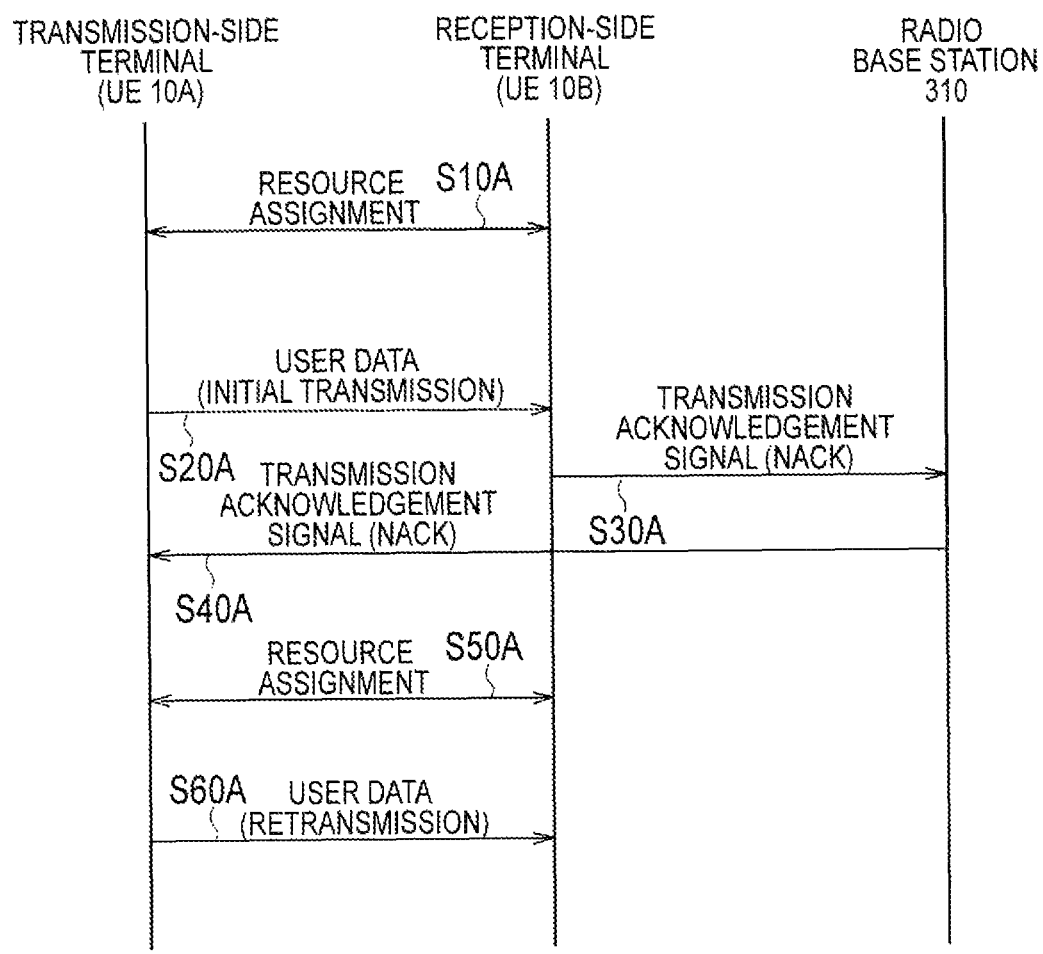
FIG. 16 is a diagram illustrating the operation of the mobile communication system 100 according to the first embodiment.

As illustrated in FIG. 16, in step 10A, the UE 10 (the UE 10A or the UE 10B) autonomously assigns the radio resource used in the user-data communication in the D2D communication from among D2D radio resources. The UE 10 notifies another UE 10 of the assigned radio resource.

In step 20A, the UE 10A transmits user data (initial transmission) to the UE 10B by using the radio resource assigned in step 10A. Similarly, the UE 10B receives the user data (initial transmission) from the UE 10A by using the radio resource assigned in step 10A.

In step 30A, the UE 10B transmits, to the radio base station 310, a transmission acknowledgement signal indicating whether the user data (initial transmission) has been able to be received. Hereinafter, the following description will be given on the assumption that NACK is transmitted as the transmission acknowledgement signal.

In step 40A, in response to the transmission acknowledgement signal received from the UE 10B, the radio base station 310 transmits the transmission acknowledgement signal to the UE 10A. Furthermore, the radio base station 310 may relay the transmission acknowledgement signal, which is received from the UE 10B, to the UE 10A. In addition, the radio base station 310 may transmit the transmission acknowledgement signal to the UE 10A, together with a signal for assigning the radio resource used in the user-data communication in the D2D communication to the UE 10A (for example, step 50A).

In step 50A, the UE 10 (the UE 10A or the UE 10B) autonomously assigns the radio resource used in the user-data communication in the D2D communication from among the D2D radio resources. The UE 10 notifies another UE 10 of the assigned radio resource.

In step 60A, the UE 10A transmits user data (retransmission) to the UE 10B by using the radio resource assigned in step 50A. Similarly, the UE 10B receives the user data (retransmission) from the UE 10A by using the radio resource assigned in step 50A.

Thirdly, the third retransmission control example illustrated in FIG. 7 will be described with reference to FIG. 17. In the case illustrated in FIG. 17, the radio resource used in the user-data communication in the D2D communication is assigned by the UE 10 (the UE 10A or the UE 10B) and retransmission control of the user data is performed by the UE 10A.

Figure 17:
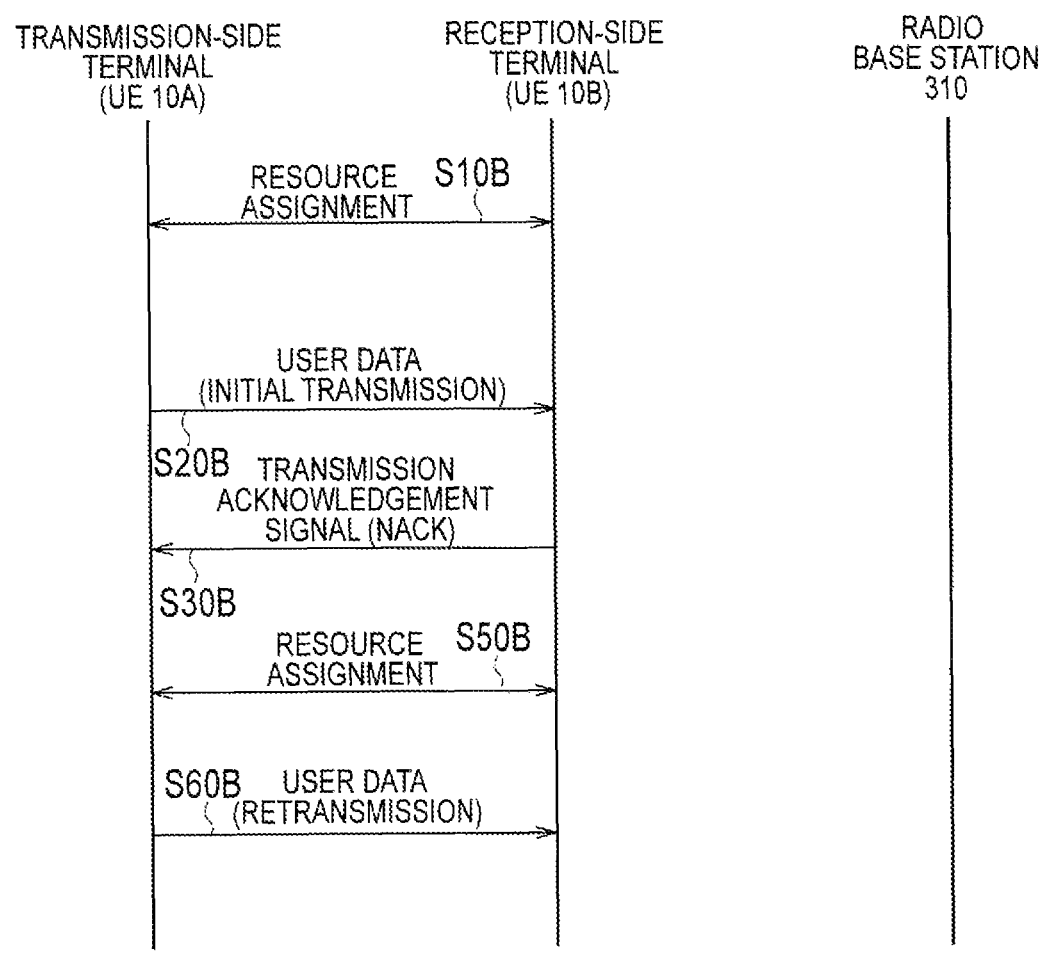
FIG. 17 is a diagram illustrating the operation of the mobile communication system 100 according to the first embodiment.

As illustrated in FIG. 17, in step 10B, the UE 10 (the UE 10A or the UE 10B) autonomously assigns the radio resource used in the user-data communication in the D2D communication from among D2D radio resources. The UE 10 notifies another UE 10 of the assigned radio resource.

In step 20B, the UE 10A transmits user data (initial transmission) to the UE 10B by using the radio resource assigned in step 10B. Similarly, the UE 10B receives the user data (initial transmission) from the UE 10A by using the radio resource assigned in step 10B.

In step 30B, the UE 10B transmits, to the UE 10A, a transmission acknowledgement signal indicating whether the user data (initial transmission) has been able to be received. Hereinafter, the following description will be given on the assumption that NACK is transmitted as the transmission acknowledgement signal.

In step 50B, the UE 10 (the UE 10A or the UE 10B) autonomously assigns the radio resource used in the user-data communication in the D2D communication from among the D2D radio resources. The UE 10 notifies another UE 10 of the assigned radio resource.

In step 60B, the UE 10A transmits user data (retransmission) to the UE 10B by using the radio resource assigned in step 50B. Similarly, the UE 10B receives the user data (retransmission) from the UE 10A by using the radio resource assigned in step 50B.

Fourthly, the fourth retransmission control example illustrated in FIG. 8 will be described with reference to FIG. 18. In the case illustrated in FIG. 18, the radio resource used in the user-data communication in the D2D communication is assigned by the radio base station 310 and retransmission control of the user data is performed by the radio base station 310. It should be noted that, in the case illustrated in FIG. 18, the radio base station 310 assigns the radio resource, which is assigned to the user-data communication directly performed between the UE 10A and the UE 10B, as the reception resource for receiving the user data.

Figure 18:
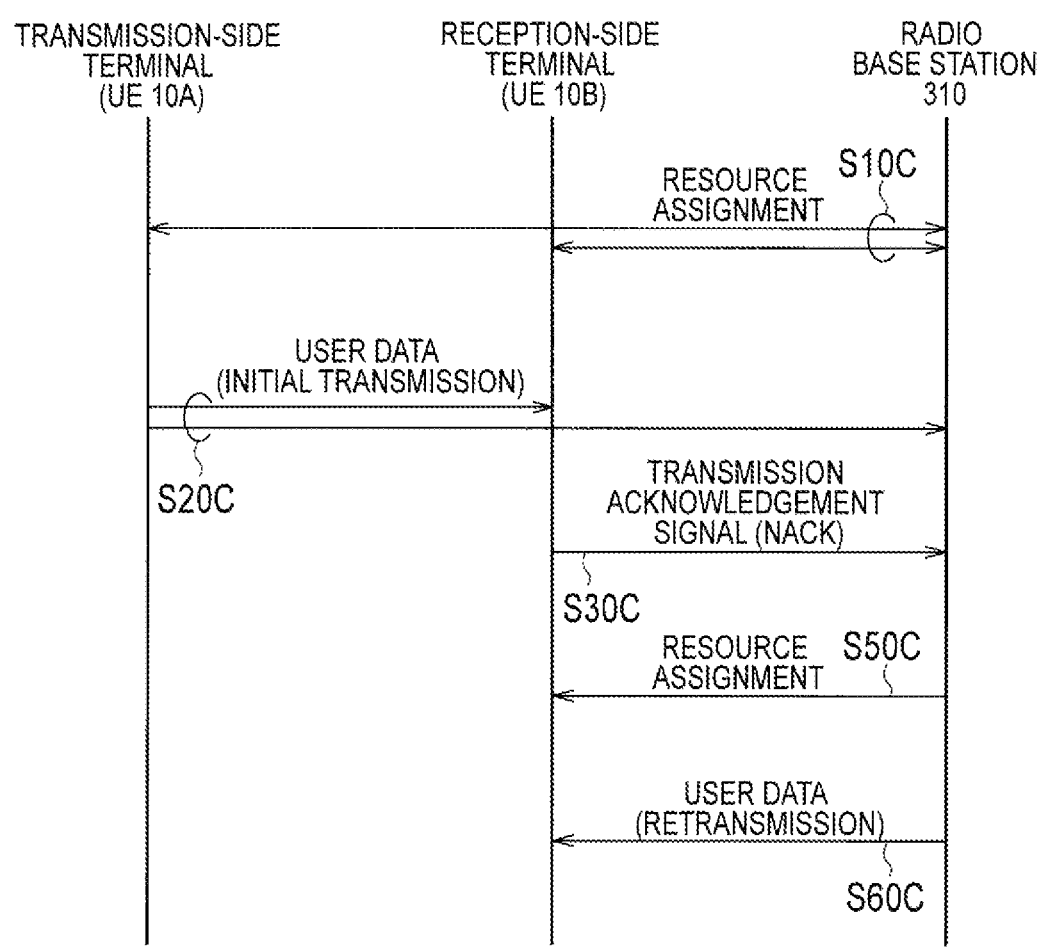
FIG. 18 is a diagram illustrating the operation of the mobile communication system 100 according to the first embodiment.

As illustrated in FIG. 18, in step 10C, the radio base station 310 assigns, to the UE 10A and the UE 10B, the radio resource used in the user-data communication in the D2D communication from among D2D radio resources. The radio base station 310 notifies the UE 10A and the UE 10B of the assigned radio resource.

In step 20C, the UE 10A transmits, to the UE 10B and the radio base station 310, user data (initial transmission) by using the radio resource assigned in step 10C. Similarly, the UE 10B and the radio base station 310 receive the user data (initial transmission) from the UE 10A by using the radio resource assigned in step 10C.

In step 30C, the UE 10B transmits, to the radio base station 310, a transmission acknowledgement signal indicating whether the user data (initial transmission) has been able to be received. Hereinafter, the following description will be given on the assumption that NACK is transmitted as the transmission acknowledgement signal.

In step 50C, the radio base station 310 assigns, to the UE 10B, the radio resource used in the user-data communication in the D2D communication from among the D2D radio resources. The radio base station 310 notifies the UE 10B of the assigned radio resource.

In step 60C, the radio base station 310 transmits user data (retransmission) to the UE 10B by using the radio resource assigned in step 50C. Similarly, the UE 10B receives the user data (retransmission) from the radio base station 310 by using the radio resource assigned in step 50C.

Fifthly, the fifth retransmission control example illustrated in FIG. 9 will be described with reference to FIG. 19.

Figure 19:
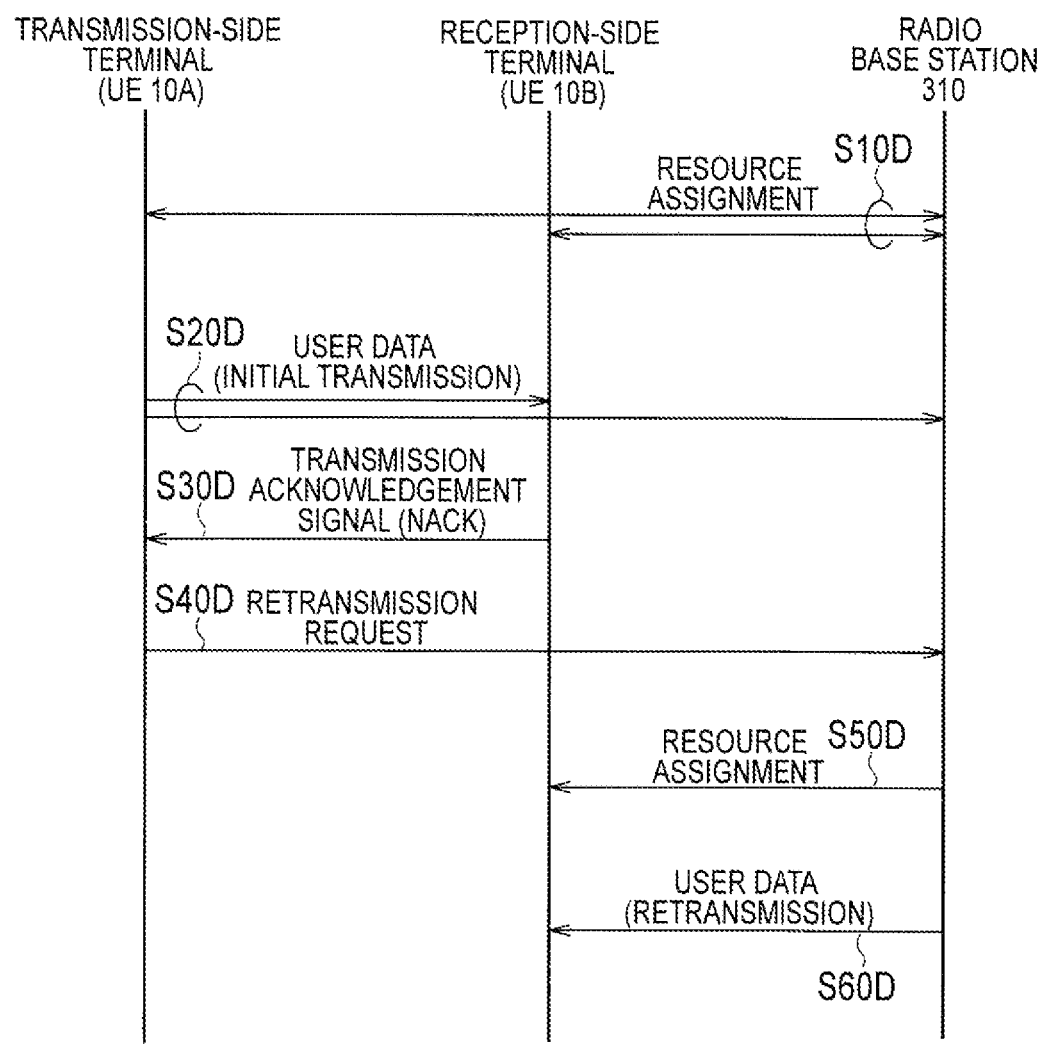
FIG. 19 is a diagram illustrating the operation of the mobile communication system 100 according to the first embodiment.

In the case illustrated in FIG. 19, the radio resource used in the user-data communication in the D2D communication is assigned by the radio base station 310 and retransmission control of the user data is performed by the radio base station 310. It should be noted that, in the case illustrated in FIG. 19, the radio base station 310 assigns the radio resource, which is assigned to the user-data communication directly performed between the UE 10A and the UE 10B, as the reception resource for receiving the user data.

As illustrated in FIG. 19, in step 10D, the radio base station 310 assigns, to the UE 10A and the UE 10B, the radio resource used in the user-data communication in the D2D communication from among D2D radio resources. The radio base station 310 notifies the UE 10A and the UE 10B of the assigned radio resource.

In step 20D, the UE 10A transmits, to the UE 10B and the radio base station 310, user data (initial transmission) by using the radio resource assigned in step 10D. Similarly, the UE 10B and the radio base station 310 receive the user data (initial transmission) from the UE 10A by using the radio resource assigned in step 10D.

In step 30D, the UE 10B transmits, to the UE 10A, a transmission acknowledgement signal indicating whether the user data (initial transmission) has been able to be received. Hereinafter, the following description will be given on the assumption that NACK is transmitted as the transmission acknowledgement signal.

In step 40D, the UE 10A transmits a retransmission request of the user data to the radio base station 310.

In step 50D, the radio base station 310 assigns, to the UE 10B, the radio resource used in the user-data communication in the D2D communication from among the D2D radio resources. The radio base station 310 notifies the UE 10B of the assigned radio resource.

In step 60D, the radio base station 310 transmits user data (retransmission) to the UE 10B by using the radio resource assigned in step 50D. Similarly, the UE 10B receives the user data (retransmission) from the radio base station 310 by using the radio resource assigned in step 50D.

Sixthly, a different retransmission control for performing a retransmission control of user data by the radio base station 310 will be described with reference to FIG. 20. In the case illustrated in FIG. 20, the radio resource used in the user-data communication in the D2D communication is assigned by the UE 10 (here, the UE 10A) and retransmission control of the user data is performed by the radio base station 310. In addition, the radio resource used in the user-data communication in the D2D communication may be assigned by the UE 10B. It should be noted that, in the case illustrated in FIG. 20, the radio base station 310 assigns the radio resource, which is assigned to the user-data communication performed between the UE 10A and the UE 10B, as the reception resource for receiving the user data.

Figure 20:
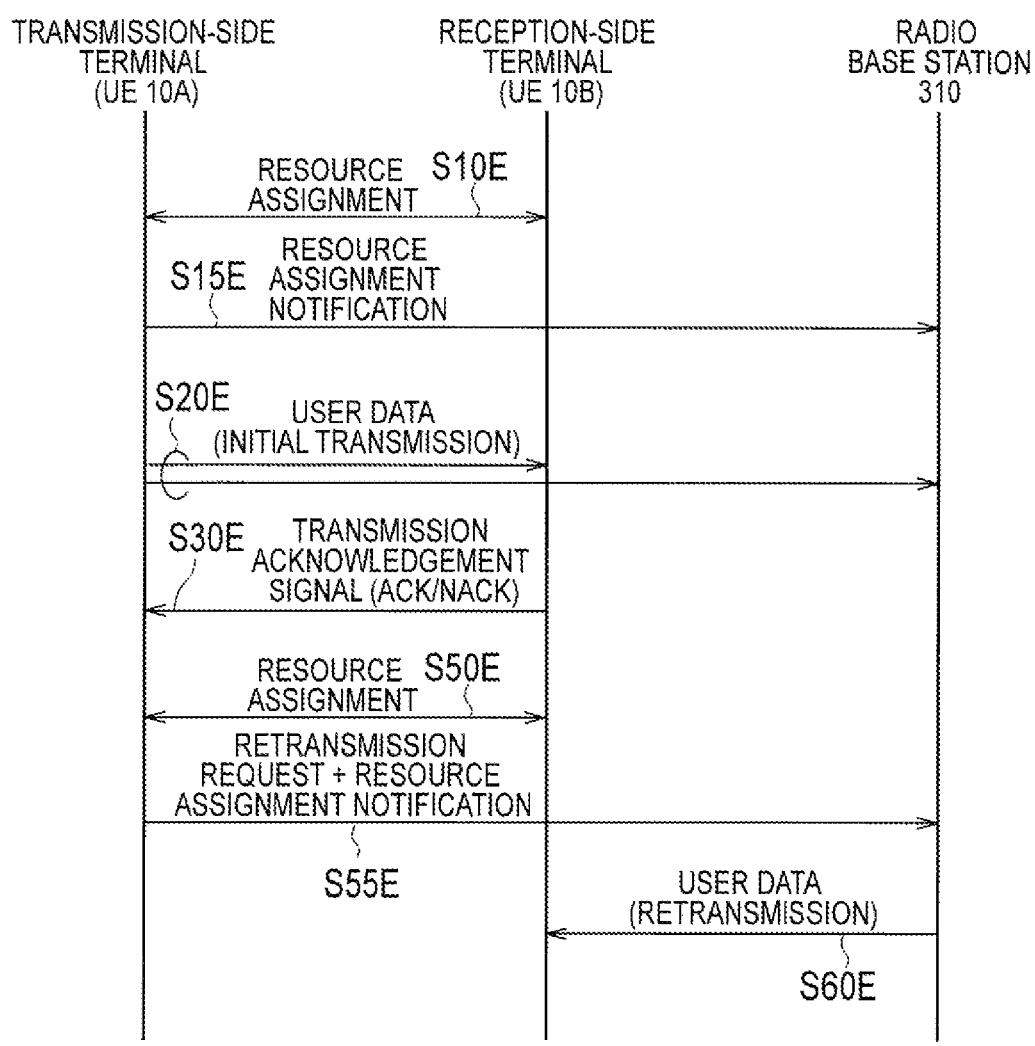
FIG. 20 is a diagram illustrating the operation of the mobile communication system 100 according to the first embodiment.

As illustrated in FIG. 20, in step 10E, the UE 10A autonomously assigns the radio resource used in the user-data communication in the D2D communication from among D2D radio resources. The UE 10 notifies another UE 10 of the assigned radio resource.

In step 15E, the UE 10A notifies the radio base station 310 of the radio resource assigned in step 10E.

In step 20E, the UE 10A transmits, to the UE 10B and the radio base station 310, user data (initial transmission) by using the radio resource assigned in step 10E. Similarly, the UE 10B and the radio base station 310 receive the user data (initial transmission) from the UE 10A by using the radio resource assigned in step 10E.

In step 30E, the UE 10B transmits, to the UE 10A, a transmission acknowledgement signal indicating whether the user data (initial transmission) has been able to be received. Hereinafter, the following description will be given on the assumption that NACK is transmitted as the transmission acknowledgement signal.

In step 50E, the UE 10A autonomously assigns the radio resource used in the user-data communication in the D2D communication from among the D2D radio resources. The UE 10A notifies the UE 10B of the assigned radio resource.

In step 55E, the UE 10A notifies the radio base station 310 of the radio resource assigned in step 50E, together with a retransmission request of the user data.

In step 60E, the radio base station 310 transmits user data (retransmission) by using the radio resource assigned in step 50E. Similarly, the UE 10B receives the user data (retransmission) from the radio base station 310 by using the radio resource assigned in step 50E.

(Operation and Effect)

In the first embodiment, the UE 10B (the reception-side terminal) transmits the transmission acknowledgement signal to the radio base station 310. Accordingly, it is possible to appropriately perform the retransmission control of the user data.

For example, when the radio base station 310 receives the user data communicated between the plurality of UEs 10, since the transmission acknowledgement signal is transmitted to the radio base station 310, the radio base station 310 is able to perform the retransmission control of the user data. Meanwhile, when the UE 10A (the transmission-side terminal) performs the retransmission control of the user data, it is sufficient if the radio base station 310 transmits the transmission acknowledgement signal to the transmission-side terminal.

In the first embodiment, the radio base station 310 assigns the reception resource for receiving the user data directly communicated between the plurality of UEs 10. That is, the radio base station 310 is able to receive the user data communicated between the plurality of UEs 10. Accordingly, for example, the transmission acknowledgement signal is transmitted to the radio base station 310, so that the radio base station 310 is able to perform the retransmission control of the user data.

[First Modification]

Hereinafter, a first modification of the first embodiment will be explained. Mainly the differences from the first embodiment will be described, below.

In the first modification, the radio base station 310 (the control unit 315) determines whether to assign the radio resource, which is assigned to the user-data communication directly performed between the UE 10A and the UE 10B, as the reception resource for receiving the user data. Specifically, when the communication state of the user data directly performed between the UE 10A and the UE 10B is poor, the radio base station 310 (the control unit 315) assigns the radio resource assigned to the user-data communication as the reception resource for receiving the user data. Similarly, when the communication state of the user data directly performed between the UE 10A and the UE 10B is poor, the radio base station 310 (the transmission unit 314 and the control unit 315) performs the retransmission control of the user data.

Furthermore, it is preferable that the radio base station 310 (the reception unit 313) receives the D2D control signal for controlling direct user-data communication from the UE 10 (the UE 10A or the UE 10B). In such a case, on the basis of the D2D control signal, the radio base station 310 (the control unit 315) determines whether to assign the reception resource for receiving the user data directly communicated between the UE 10A and the UE 10B. Similarly, on the basis of the D2D control signal, the radio base station 310 (the transmission unit 314 and the control unit 315) determines whether to perform the retransmission control of the user data.

In the first modification, the D2D control signal may be transmitted from the UE 10A (the transmission unit 14A) to the radio base station 310, or may be transmitted from the UE 10B (the transmission unit 14B) to the radio base station 310.

It is preferable that the D2D control signal indicates at least one of: a transmission acknowledgement signal indicating whether the reception-side terminal has been able to receive user data transmitted from the UE 10A; transmission power used in the user-data communication; and a modulation coding scheme used in the user-data communication. It should be noted that, in such a case, the radio base station 310 (the control unit 315) determines, on the basis of the D2D control signal, whether the communication state of the user data directly performed between the UE 10A and the UE 10B is poor.

Alternatively, it is preferable that the D2D control signal indicates at least one of: a signal for requesting the retransmission control of the user data; a signal indicating that the transmission power used in the user-data communication has exceeded a threshold value; and a signal indicating that the modulation coding scheme used in the user-data communication has been below a threshold value. It should be noted that, in such a case, the radio base station 310 (the control unit 315) determines whether the communication state of the user data directly performed between the UE 10A and the UE 10B is poor.

Alternatively, the D2D control signal may indicate at least one of: a signal indicating that the transmission power used in the user-data communication has been below a threshold value; and a signal indicating that the modulation coding scheme used in the user-data communication has exceeded a threshold value. In such a case, the UE 10 (the control unit 15A or the control unit 15B) is able to determine whether the communication state of the user data directly performed between the UE 10A and the UE 10B is good.

Alternatively, the D2D control signal may indicate a signal for instructing the radio base station 310 whether to assign the radio resource, which was assigned to the user-data communication performed between the UE 10A and the UE 10B, as the reception resource for receiving the user data.

(Operation of Mobile Communication System)

Figure 21:
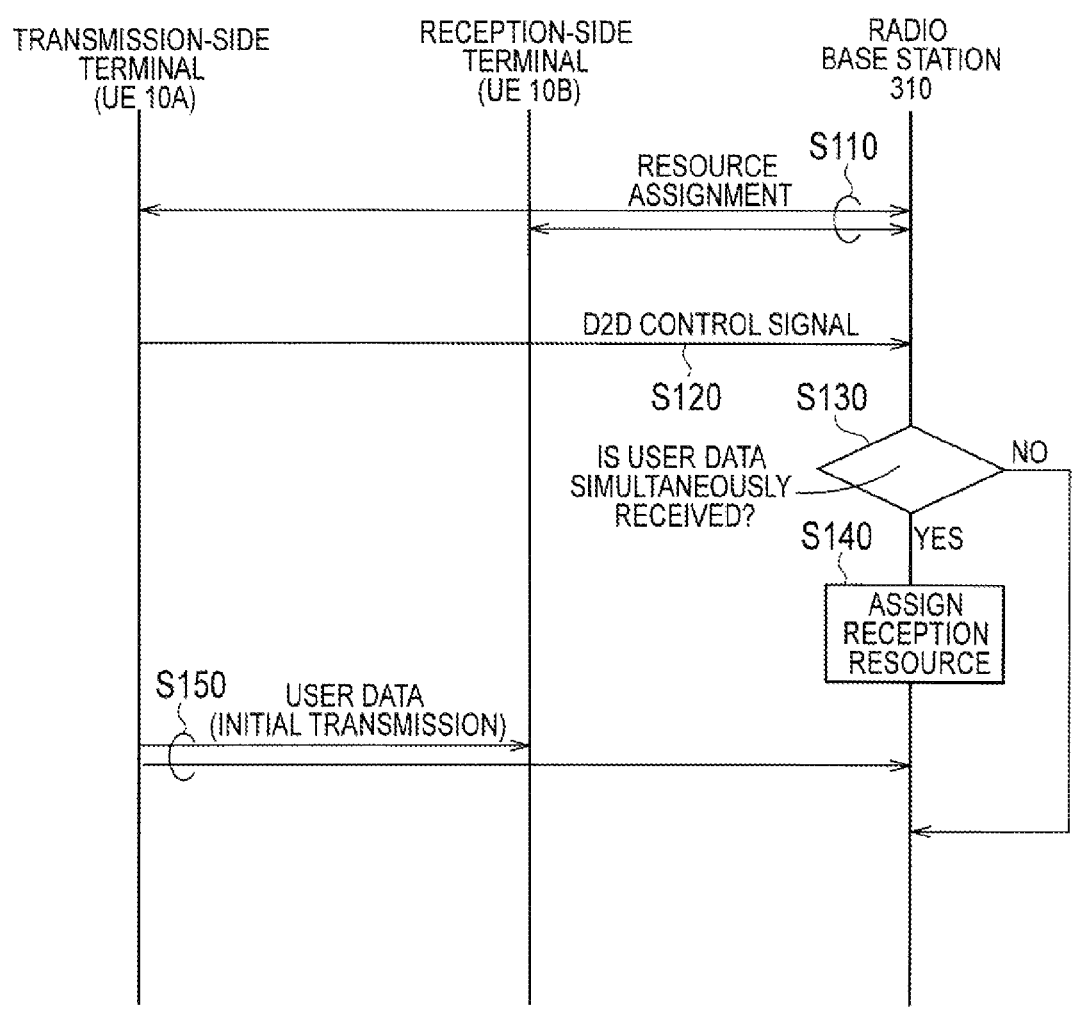
FIG. 21 is a diagram illustrating the operation of the mobile communication system 100 according to the first modification.
Figure 22:
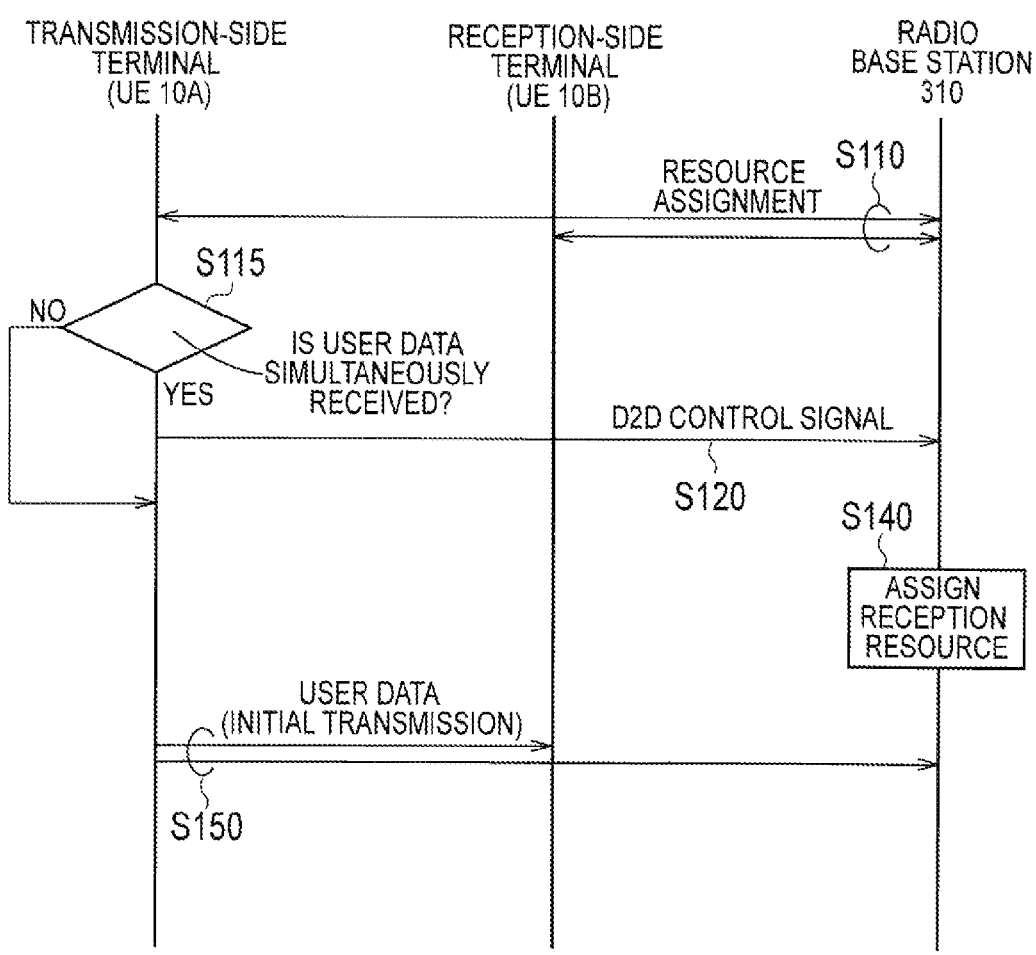
FIG. 22 is a diagram illustrating the operation of the mobile communication system 100 according to the first modification.

Hereinafter, the operation of a mobile communication system according to the first modification will be described. FIG. 21 and FIG. 22 are diagrams illustrating the operation of a mobile communication system 100 according to the first modification.

Firstly, with reference to FIG. 21, a description will be provided for the case in which the radio base station 310 determines whether the communication state of user data in the D2D communication is poor.

As illustrated in FIG. 21, in step 110, the radio base station 310 assigns, to the UE 10A and the UE 10B, a radio resource used in the user-data communication in the D2D communication from among the D2D radio resources. The radio base station 310 notifies the UE 10A and the UE 10B of the assigned radio resource.

In step 120, the UE 10A transmits the D2D control signal to the radio base station 310. Furthermore, it is preferable that the D2D control signal indicates at least one of: a transmission acknowledgement signal indicating whether the reception-side terminal has been able to receive user data transmitted from the UE 10A; transmission power used in the user-data communication; and a modulation coding scheme used in the user-data communication.

In step 130, the radio base station 310 determines whether to receive user data directly communicated between the UE 10A and the UE 10B (to perform simultaneous reception of the user data). Specifically, when the communication state of the user data directly performed between the UE 10A and the UE 10B is poor, the radio base station 310 determines to perform the simultaneous reception of the user data.

Specifically, on the basis of the D2D control signal, the radio base station 310 determines whether the communication state of the user data is poor. For example, when the transmission acknowledgement signal is NACK, the radio base station 310 determines that the communication state of the user data is poor. Alternatively, when the transmission power used in the user-data communication exceeds a threshold value, the radio base station 310 determines that the communication state of the user data is poor. Alternatively, when the modulation coding scheme used in the user-data communication is below a threshold value, the radio base station 310 determines that the communication state of the user data is poor.

When a result of the determination is "YES", the radio base station 310 performs a process in step 140. When the result of the determination is "NO", the radio base station 310 completes a series of processes.

In step 140, the radio base station 310 assigns a reception resource for receiving the user data directly communicated between the UE 10A and the UE 10B.

In step 150, the UE 10A transmits user data (initial transmission) by using the radio resource assigned in step 110. Similarly, the UE 10B and the radio base station 310 receive the user data (initial transmission) from the UE 10A by using the radio resource assigned in step 110.

Alternatively, between step 140 and step 150, it is possible to provide a step of reassigning, by the radio base station 310, to the UE 10A and the UE 10B, the radio resource used in the user-data communication in the D2D communication from among the D2D radio resources.

Furthermore, it should be noted that when the user data is not simultaneously received, the radio base station 310 is not able to retransmit the user data. That is, it should be noted that when the communication state of the user data is good, the retransmission control of the user data is not performed.

Secondly, with reference to FIG. 22, a description will be provided for the case in which the UE 10 (the UE 10A) determines whether the communication state of user data in the D2D communication is poor. In FIG. 22, the same reference numerals are used to the processes equal to those of FIG. 21.

As illustrated in FIG. 22, in step S115, the UE 10A determines whether to allow the radio base station 310 to receive user data directly communicated between the UE 10A and the UE 10B (to allow the radio base station 310 to perform simultaneous reception of the user data). Specifically, when the communication state of the user data directly performed between the UE 10A and the UE 10B is poor, the UE 10A determines to perform the simultaneous reception of the user data.

Specifically, when transmission power used in the user-data communication exceeds a threshold value, the UE 10A determines that the communication state of the user data is poor. Alternatively, when a modulation coding scheme used in the user-data communication is below a threshold value, the UE 10A determines that the communication state of the user data is poor.

When a result of the determination is "YES", the UE 10A performs a process of step 120. When the result of the determination is "NO", the UE 10A completes a series of processes.

In step 120, the UE 10A transmits the D2D control signal to the radio base station 310. Furthermore, it is preferable that the D2D control signal indicates at least one of: a signal for requesting the retransmission control of the user data; a signal indicating that the transmission power used in the user-data communication has exceeded a threshold value; and a signal indicating that the modulation coding scheme used in the user-data communication has been below a threshold value.

It should be noted that, in the case illustrated in FIG. 22, when the D2D control signal is received, the radio base station 310 assigns a reception resource for receiving the user data directly communicated between the UE 10A and the UE 10B.

In the case illustrated in FIG. 22, the D2D control signal is transmitted by the UE 10A. However, the embodiment is not limited thereto. The D2D control signal may be transmitted by the UE 10B.

(Operation and Effect)

In the first modification, when the communication state of the user data is poor, the radio base station 310 assigns the reception resource for receiving the user data directly communicated between the UE 10A and the UE 10B. In other words, when the communication state of the user data is good, the radio base station 310 does not assign the reception resource for receiving the user data directly communicated between the UE 10A and the UE 10B. That is, when the communication state of the user data is good, the reception resource for receiving the user data directly communicated between the UE 10A and the UE 10B may be used to receive uplink data from another UE 10. Consequently, it is possible to usefully use the reception resource of the radio base station 310.

Other Embodiments

The present invention is explained through the above embodiment, but it must not be assumed that this invention is limited by the statements and the drawings constituting a part of this disclosure. From this disclosure, various alternative embodiments, examples, and operational technologies will become apparent to those skilled in the art.

The embodiment has described the case in which two UEs 10 communicate with each other in the D2D communication. However, the embodiment is not limited thereto. Specifically, in the D2D communication, three or more UEs 10 may communicate with one another.

In the first modification, the communication state of the user data directly performed between the UE 10A and the UE 10B is mainly determined on the basis of the transmission power used in the user-data communication or the modulation coding scheme used in the user-data communication. However, the embodiment is not limited thereto. The communication state of the user data directly performed between the UE 10A and the UE 10B may be determined on the basis of at least one of: a block error rate; a packet error rate; whether QoS is satisfied; CQI; and a processing load of the UE 10A.

In the first modification, it is determined whether the communication state of the user data directly performed between the UE 10A and the UE 10B is poor. However, the embodiment is not limited thereto. It may be determined whether the communication state of the user data directly performed between the UE 10A and the UE 10B is good. It should be noted that, in such a case, "YES" and "NO" are reversed for the result of the determination of step 130 illustrated in FIG. 21. It should be noted that, similarly, "YES" and "NO" are reversed for the result of the determination in step 115 illustrated in FIG. 22.

Particularly not mentioned in the embodiment, it is possible to provide a program for causing a computer to execute each process performed by the UE 10 (the UE 10A or the UE 10B). Furthermore, the program may be recorded on a computer-readable medium. By using the computer-readable medium, it is possible to install the program in a computer. Furthermore, the computer-readable medium recording the program thereon may include a non-transitory recording medium. The non-transitory recording medium is not particularly limited. For example, the non-transitory recording medium may include a recording medium such as CD-ROM or DVD-ROM.

Alternatively, it is also possible to provide a chip configured by a memory for storing a program for performing each process performed by the UE 10 (the UE 10A or the UE 10B), and a processor for executing the program stored in the memory.

Thus, the present invention includes various embodiments which are not described herein. Further, embodiments and modifications described above can be combined. Therefore, the technical scope of the present invention is defined only by the matters specifying the invention according to claims based on the above description.

In addition, the entire content of U.S. Provisional Application No. 61/664,951 (filed on Jun. 27, 2012) is incorporated herein by reference.

INDUSTRIAL APPLICABILITY

According to present invention, it is possible to provide a mobile communication system, a radio terminal, a radio base station, a mobile communication method, and a processor which perform a retransmission control of user data.

The invention claimed is:

1. A mobile communication system, comprising:
a first radio terminal;
a second radio terminal; and
a base station, wherein
the first radio terminal directly transmits user data to the second radio terminal by device to device (D2D) communication,
the second radio terminal transmits a first radio signal,
the first radio signal indicates whether or not the second radio terminal has received the user data,
the base station receives the first radio signal from the second radio terminal,
the base station transmits a second radio signal to the first radio terminal in response to a reception of the first radio signal,
the second radio signal indicates whether or not the second radio terminal has received the user data,
the first radio terminal receives the second radio signal form the base station, and
the first radio terminal determines whether to retransmit the user data to the second radio terminal on a basis of the first radio signal without use of the second radio signal in response to a communication state of the D2D communication exceeding a threshold value.

2. The mobile communication system according to claim 1, wherein, the second radio terminal transmits the first radio signal to the base station in response to the communication state being below a threshold value.

3. A first radio terminal, comprising:
a transmitter that directly transmits user data to a second radio terminal by device to device (D2D) communication,
a receiver that directly receives a first radio signal from the second radio terminal, wherein
the first radio signal indicates whether or not the second radio terminal has received the user data,
the receiver further receives a second radio signal from a base station,
the second radio signal indicates whether or not the second radio terminal has received the user data,
the first radio terminal further comprises a controller that determines whether to retransmit the user data to the second radio terminal, and
the controller determines whether to retransmit the user data to the second radio terminal, on a basis of the first radio signal without use of the second radio signal in response to a communication state of the D2D communication exceeding a threshold value.

4. A first radio terminal, comprising:
a transmitter that directly transmits user data to a second radio terminal by device to device (D2D) communication,
a receiver that directly receives a first radio signal from the second radio terminal, wherein
the first radio signal indicates whether or not the second radio terminal has received the user data,
the receiver further receives a second radio signal from a base station,
the second radio signal indicates whether or not the second radio terminal has received the user data,
the first radio terminal further comprises a controller that determines whether to retransmit the user data to the second radio terminal, and
the controller notifies the base station of whether to use to the second radio signal for the determination.

5. A mobile communication method, comprising:
directly transmitting, by a first radio terminal, user data to a second radio terminal by device to device (D2D) communication;
transmitting, by the second user terminal, a first radio signal indicating whether or not the second radio terminal has received the user data,
directly receiving, by the first radio terminal, the first radio signal from the second radio terminal,
receiving, by a base station, the first radio signal from the second radio terminal,
transmitting, by the base station, a second radio signal to the first radio terminal, the second radio signal indicating whether or not the second radio terminal has received the user data,
receiving, by the first radio terminal, the second radio signal from the base station,
determining, by the first radio terminal, whether to retransmit the user data to the second radio terminal on a basis of the first radio signal without use of the second radio signal in response to a communication state of the D2D communication exceeding a threshold value.

6. A processing system for controlling a first radio terminal comprising a processor, and a memory communicatively coupled to the processor, the processor configured to:

directly transmit user data to a second radio terminal by device to device (D2D) communication, and
directly receive a first radio signal from the second radio terminal, the first radio signal indicating whether or not the second radio terminal has received the user data,
further receive a second radio signal from a base station, the second radio signal indicating whether or not the second radio terminal has received the user data, and
determine whether to retransmit the user data to the second radio terminal, wherein
in the determination, the processor determines whether to retransmit the user data to the second radio terminal, on a basis of the first radio signal without use of the second radio signal in response to a communication state of the D2D communication exceeding a threshold value.

* * * * *